United States Patent
Stultz et al.

(10) Patent No.: US 11,467,469 B1
(45) Date of Patent: Oct. 11, 2022

(54) HYBRID MATERIAL OPTICAL PARAMETRIC AMPLIFIER

(71) Applicant: Raytheon Company, Waltham, MA (US)

(72) Inventors: Robert D. Stultz, Cypress, CA (US); Todd O. Clatterbuck, Los Angeles, CA (US); Aleksandr S. Radunsky, Lawndale, CA (US); Aaron B. Potter, Torrance, CA (US); Katherine V. Palombo, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/207,384

(22) Filed: Mar. 19, 2021

(51) Int. Cl.
  *G02F 1/35* (2006.01)
  *G02F 1/39* (2006.01)
  *G02F 1/355* (2006.01)

(52) U.S. Cl.
  CPC .......... *G02F 1/3507* (2021.01); *G02F 1/3503* (2021.01); *G02F 1/3553* (2013.01); *G02F 1/392* (2021.01)

(58) Field of Classification Search
  CPC ............................... G02F 1/3507; G02F 1/392
  See application file for complete search history.

(56) References Cited

U.S. PATENT DOCUMENTS

| 9,280,031 | B2 | 3/2016 | Stultz et al. | |
|---|---|---|---|---|
| 2016/0026066 | A1* | 1/2016 | Stultz | G02F 1/3544 359/330 |

FOREIGN PATENT DOCUMENTS

EP  3798723 A1 * 3/2021

OTHER PUBLICATIONS

M. A. Massie, et al., "Neuromorphic infrared focal plane performs sensor fusion on-plane local contrast enhancement spatial and temporal filtering," Wright Lab—Armament Directorate, Eglin Air Force Base, SPIE Proc., vol. 1961, pp. 160-174, 1993, 15 pages.

J. P. Curzan, et al., "Variable Acuity Imager with Dynamically Steerable, Programmable Suerpixels," Air Force Research Laboratory, Release Authority #AAC-PA02-325, pp. 1-9, Approved Jul. 1, 2002, 9 pages.

Paul L. McCarley, et al., "Large format variable spatial acuity superpixel imaging: visible and infrared systems applications," Air Force Research Laboratory, Munitions Directorate (AFRL/MNGI); Nova Biomimetics, pp. 1-9, 2002, 9 pages.

Magnus W. Haakestad, et al., "High-pulse-energy mid-infrared laser source based on optical parametric amplification in ZnGeP2," Optical Society of America, Optics Express, vol. 16, No. 18, pp. 14263-14273, Sep. 1, 2008, 11 pages.

(Continued)

*Primary Examiner* — Rhonda S Peace

(57) ABSTRACT

An apparatus includes a plurality of front-end nonlinear optical crystals and a plurality of back-end nonlinear optical crystals. The front-end nonlinear optical crystals are arranged in a chain and are configured to amplify a received signal. The back-end nonlinear optical crystals are arranged in the chain after the front-end nonlinear optical crystals and are configured to further amplify the received signal and generate an amplified signal. The back-end nonlinear optical crystals are made from a different nonlinear optical crystal than the front-end nonlinear optical crystals.

20 Claims, 21 Drawing Sheets

(56) References Cited

OTHER PUBLICATIONS

Giedrius Andriukaitis, et al., "90 GW peak power few-cycle mid-infrared pulses from an optical parametric amplifier," Optical Society of America, Optics Letters, vol. 36, No. 15, pp. 2755-2757, Aug. 1, 2011, 3 pages.

Pavel Malevich, et la., "Broadband mid-infrared pulses from potassium titanyl arsenate/zinc germanium phosphate optical parametric ammplifier pumped by Tm, Ho-fiber-seeded Ho:YAG chirped-pulse amplifier," Optics Letters, vol. 41, No. 5, pp. 930-933, Mar. 1, 2016, 4 pages.

\* cited by examiner

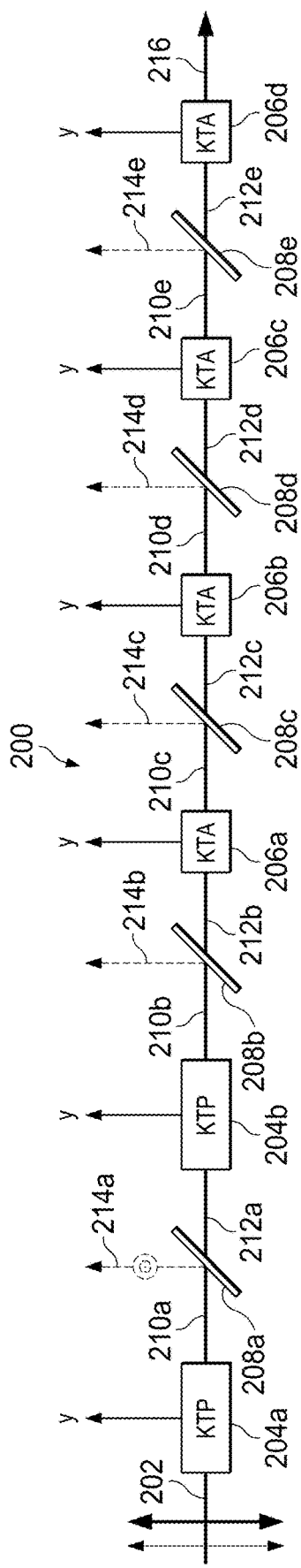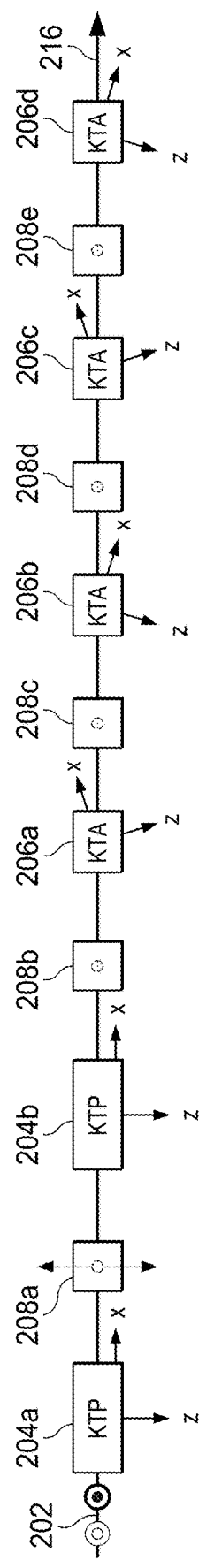
FIG. 2A
FIG. 2B

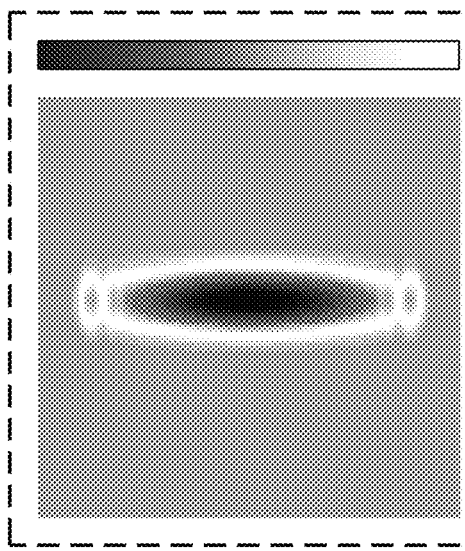
FIG. 9C
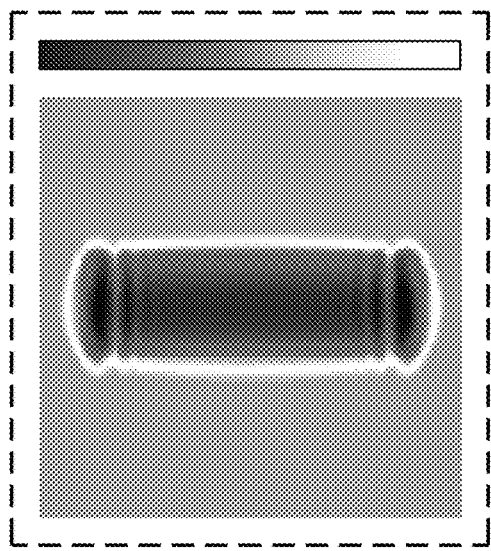
FIG. 9F
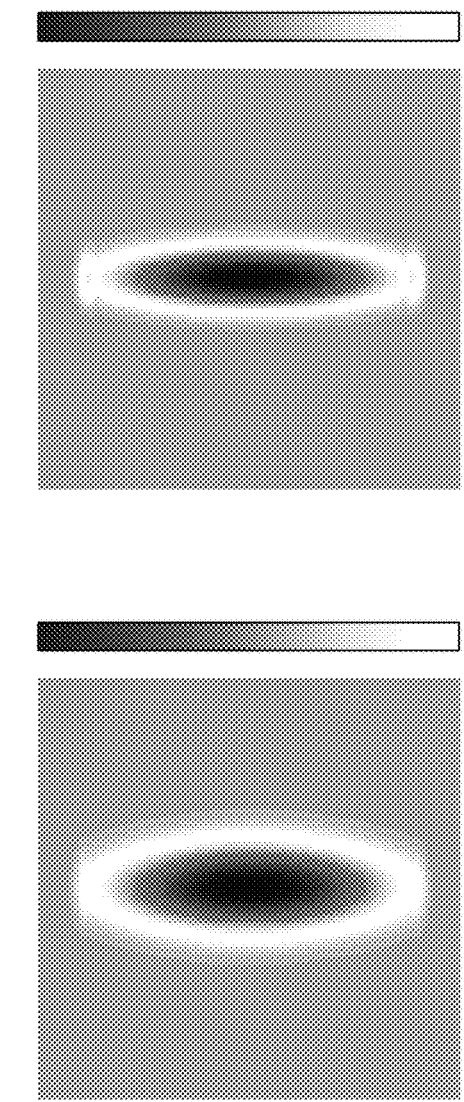
FIG. 9B
FIG. 9E
FIG. 9A
FIG. 9D

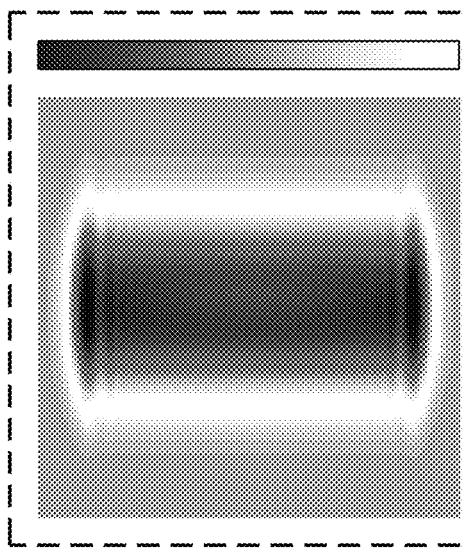
FIG. 12C
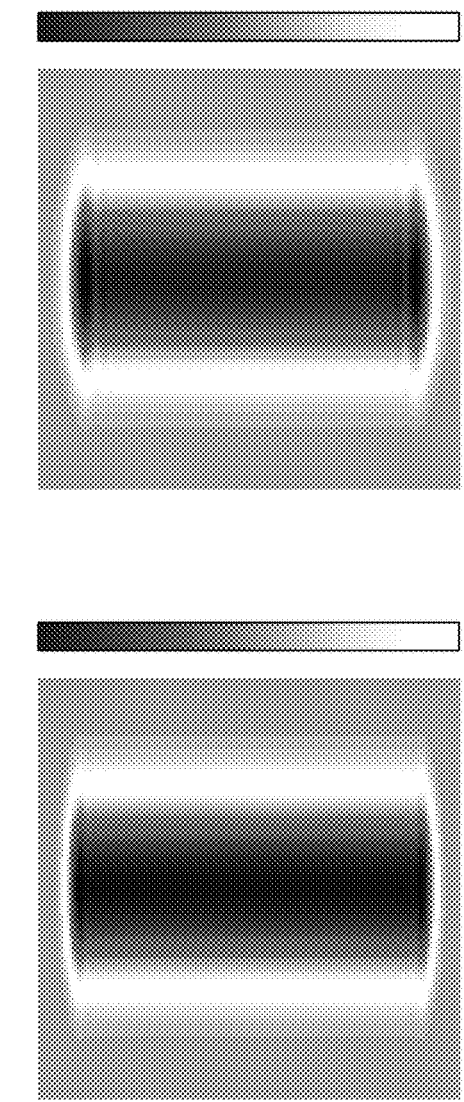
FIG. 12B
FIG. 12A
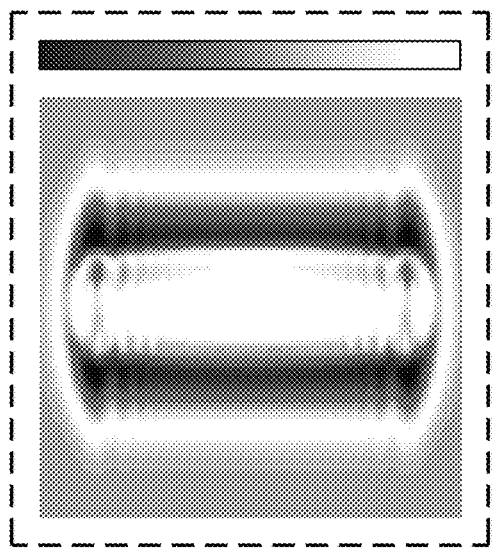
FIG. 12F
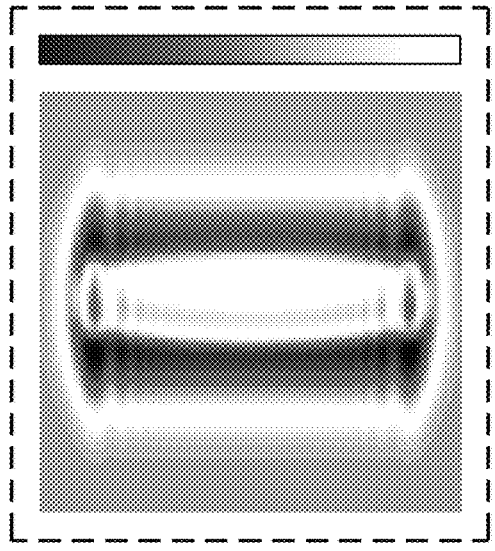
FIG. 12E
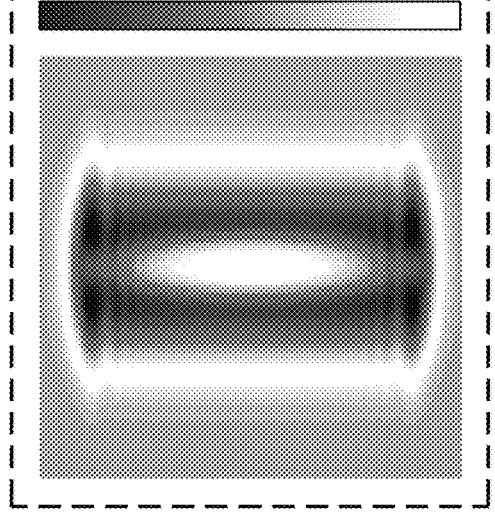
FIG. 12D

HYBRID MATERIAL OPTICAL PARAMETRIC AMPLIFIER

TECHNICAL FIELD

This disclosure relates generally to optical parametric amplification devices and processes. More specifically, this disclosure relates to a hybrid material optical parametric amplifier.

BACKGROUND

High-power wavelength conversion using an optical parametric amplifier seeded with a low-power source typically uses multiple nonlinear crystals for conversion efficiency and beam quality. However, a single crystalline material may not possess the characteristics needed for a producible design. Fabrication limitations due to difficulties in crystal growth and optical transmission are examples of such characteristics. Some materials with good transmission properties are limited to smaller fabrication sizes, while other materials may be available in larger fabrication sizes with power-limiting optical absorption.

SUMMARY

This disclosure provides hybrid material optical parametric amplifiers.

In a first embodiment, an apparatus includes a plurality of front-end nonlinear optical crystals and a plurality of back-end nonlinear optical crystals. The front-end nonlinear optical crystals are arranged in a chain and are configured to amplify a received signal. The back-end nonlinear optical crystals are arranged in the chain after the front-end nonlinear optical crystals and are configured to further amplify the received signal and generate an amplified signal. The back-end nonlinear optical crystals are made from a different nonlinear optical crystalline material than the front-end nonlinear optical crystals.

In a second embodiment, a method includes receiving and amplifying a signal using a plurality of front-end nonlinear optical crystals arranged in a chain. The method also includes generating an amplified signal by further amplifying the received signal using a plurality of back-end nonlinear optical crystals arranged in the chain after the front-end nonlinear optical crystals. The back-end nonlinear optical crystals are made from a different nonlinear optical crystalline material than the front-end nonlinear optical crystals.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which:

FIGS. 2A and 2B illustrate a first example hybrid material optical parametric amplifier in accordance with this disclosure;

FIGS. 9A through 9F illustrate an example signal beam propagation evolution through an all-KTA-crystal optical parametric amplifier in accordance with this disclosure;

FIGS. 12A through 12F illustrate an example pump beam propagation evolution through an all-KTA-crystal optical parametric amplifier in accordance with this disclosure;

DETAILED DESCRIPTION

FIGS. 1 through 21, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

Potassium titanyl phosphate (KTiOPO$_4$ or "KTP") crystal isomorphs, potassium titanyl arsenate (KTiOAsO$_4$ or "KTA") crystal isomorphs, and rubidium titanyl arsenate (RbTiOAsO$_4$ or "RTA") crystal isomorphs can be used to efficiently convert a 1-micron laser output to an eye-safe wavelength near 1.5 microns. RTA crystals have good transparency (low absorption) at all three optical parametric amplifier wavelengths but are difficult to grow in a single domain and have a low manufacturing readiness level (MRL). Satisfactory fabrication yields for RTA crystals can only be achieved in small crystal sizes, such as approximately 8 mm by 10 mm by 10 mm. Even then, each RTA crystal often needs to be individually screened for optical defects and gain uniformity. Also, RTA crystals are no longer produced commercially, so fabrication development costs have to be covered by optical parametric amplifier producers and/or their customers.

KTP crystals are much easier to grow in a single domain and are readily available in high-quality large sizes, such as 15 mm by 20 mm by 40 mm. Currently, KTP crystals are in wide use for both commercial and defense-related applications, and there are multiple suppliers in the United States. However, KTP crystals have high optical absorption at the 3-micron idler frequency, which is always produced in a 1-micron to 1.5-micron optical parametric amplifier. The high optical absorption restricts an all-KTP crystal optical parametric amplifier design to low average power. The absorption at a high average power can result in thermo-optical distortions and de-phasing, severely impacting conversion efficiency and beam quality.

KTA crystals have good transparency across different optical parametric amplifier wavelengths and a significantly higher manufacturing readiness level than RTA crystals, and single-domain KTA crystals are currently being commercially produced. However, KTA crystals have similar crystal growth challenges as RTA crystals and are therefore generally restricted to smaller crystal sizes than KTP crystals. This means that an all-KTA crystal optical parametric amplifier design may require a significantly larger number of nonlinear optical crystals.

Figure 1:
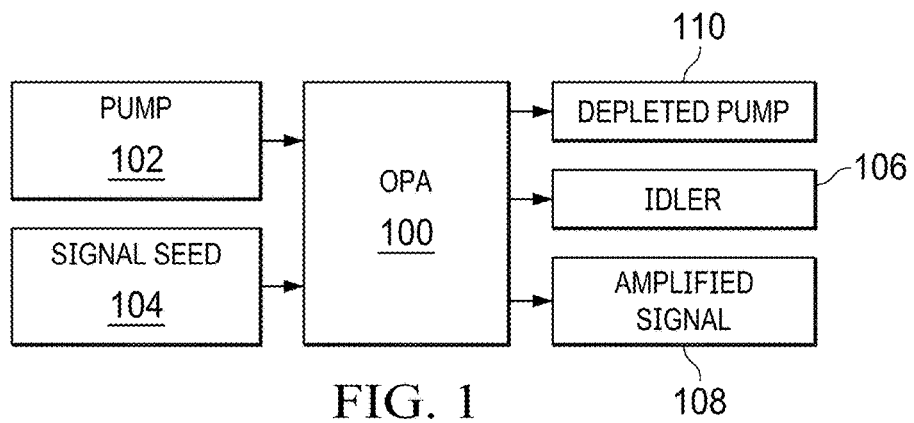
FIG. 1 illustrates an example optical parametric amplifier.

FIG. 1 illustrates an example optical parametric amplifier (OPA) 100. As shown in FIG. 1, the optical parametric amplifier 100 receives a high-power pulsed pump beam 102 along with a low-power continuous-wave (CW) signal seed 104. In some embodiments, the optical parametric amplifier 100 uses a non-critically-phased-matched (NCPM) nonlinear optical crystal for the gain stage. As non-limiting examples, the crystal material can be formed from RTA, KTA, KTP, or any other suitable nonlinear optical crystal material. The pulsed pump beam 102 can have a non-uniform spatial profile. In some embodiments, the pulsed pump beam 102 has a Gaussian or top-hat by Gaussian spatial profile. The signal seed 104 is amplified to produce an amplified signal 106. An idler 108 is also created in the optical parametric amplifier 100. The growth of the signal and idler energies accompany a corresponding depletion of the pulsed pump beam energy 102. The optical parametric amplifier 100 produces a depleted pump beam 110 by depleting the pulsed pump beam 102. The principle of photon energy conservation can be expressed as follows:

$$\omega_3 = \omega_1 + \omega_2 \quad (1)$$

where $\omega_1$ represents a frequency of the signal seed 104, $\omega_2$ represents a frequency of the idler beam 108, and $\omega_3$ represents a frequency of the pulsed pump beam 102. A phase matching condition can be expressed as follows:

$$k_3 = k_1 + k_2 \quad (2)$$

where $k_1$ represents a wave vector of the signal seed 104, $k_2$ represents a wave vector of the idler 108, and $k_3$ represents a wave vector of the pulsed pump beam 102.

In some embodiments, the pulsed pump beam 102 can have a wavelength of about 1030 nanometers (nm), the signal seed 104 and the amplified signal 106 can have a wavelength of about 1510 nm, and the idler 108 can have a wavelength of about 3244 nm. An amplified signal 106 having a wavelength of about 1510 nm may be desirable in some applications because it is "eye-safe," has good atmospheric transmission, and can be used with a standard telecommunications diode laser to produce the signal seed 104. Accordingly, these values may be used for some of the examples discussed below. However, it will be appreciated by those skilled in the art, given the benefit of this disclosure, that the aspects and principles discussed here may be applied to a wide variety of wavelengths, and this disclosure is not limited to any specific examples discussed here.

In some embodiments, a pulsed pump beam 102 at about 1030 nm can be produced using a Yb:YAG laser. As discussed above, the optical parametric amplifier 100 can include one or more nonlinear crystals (such as RTA crystals) in a non-critical-phase-match orientation. RTA may be preferable in some examples, such as in applications using the above-mentioned or similar wavelengths, because RTA crystals are optically transparent at all three wavelengths (pump, signal, and idler). Additionally, RTA crystals allow co-linear propagation along the crystalline axis with no spatial walk-off in the optical parametric amplifier gain stage. However, as noted above, in other examples and applications, other optical crystal materials may be used. In one example, the phase-matching of the nonlinear crystals is birefringence phase matching of Type II where the idler polarization is orthogonal to the pump and signal polarizations. In some embodiments, the phase-matching of the nonlinear crystals is quasi-phase-matching of Type II where the idler polarization is orthogonal to the pump and signal polarizations.

Figure 4:
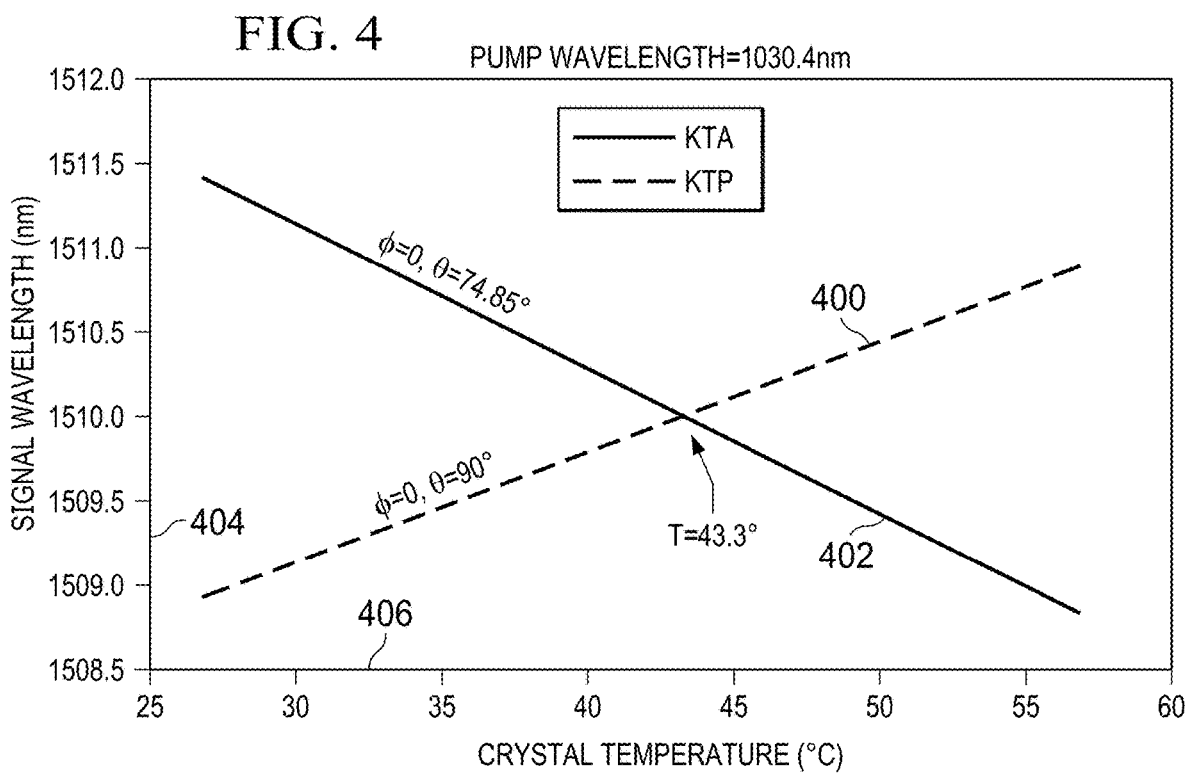
FIG. 4 illustrates an example temperature tuning for nonlinear optical crystals in accordance with this disclosure.
Figure 3A:
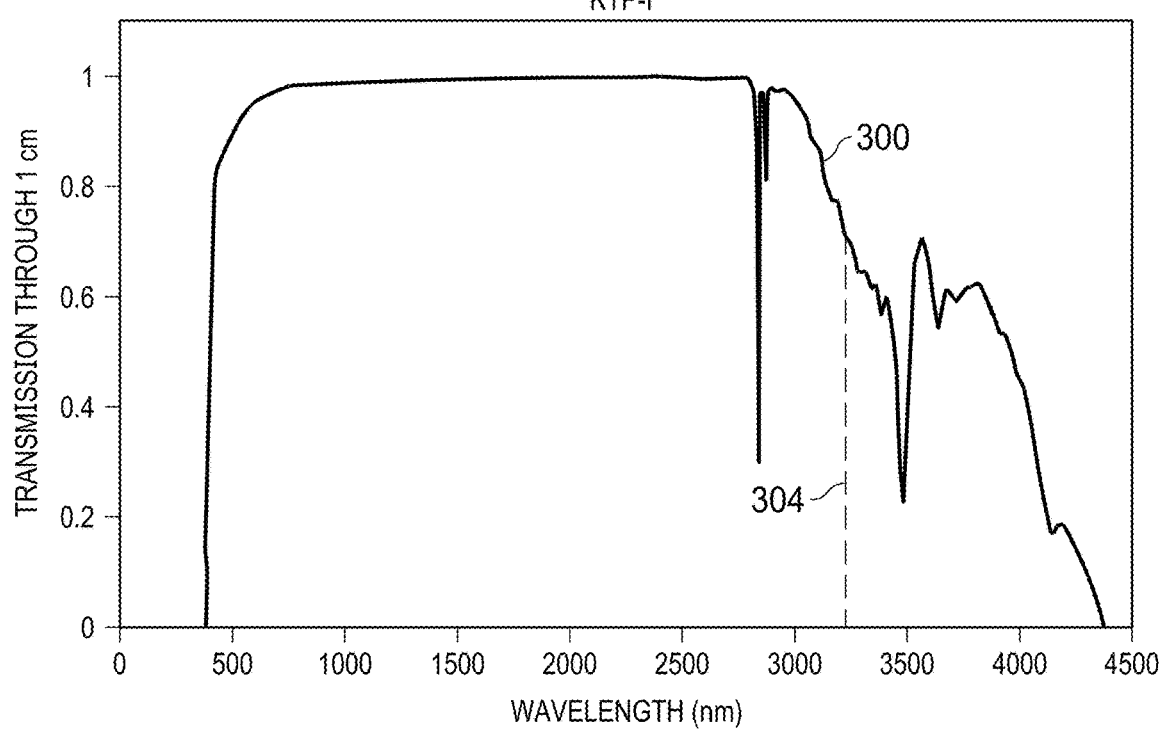
FIGS. 3A and 3B illustrate example nonlinear optical crystal transmission spectra in accordance with this disclosure.
Figure 3B:
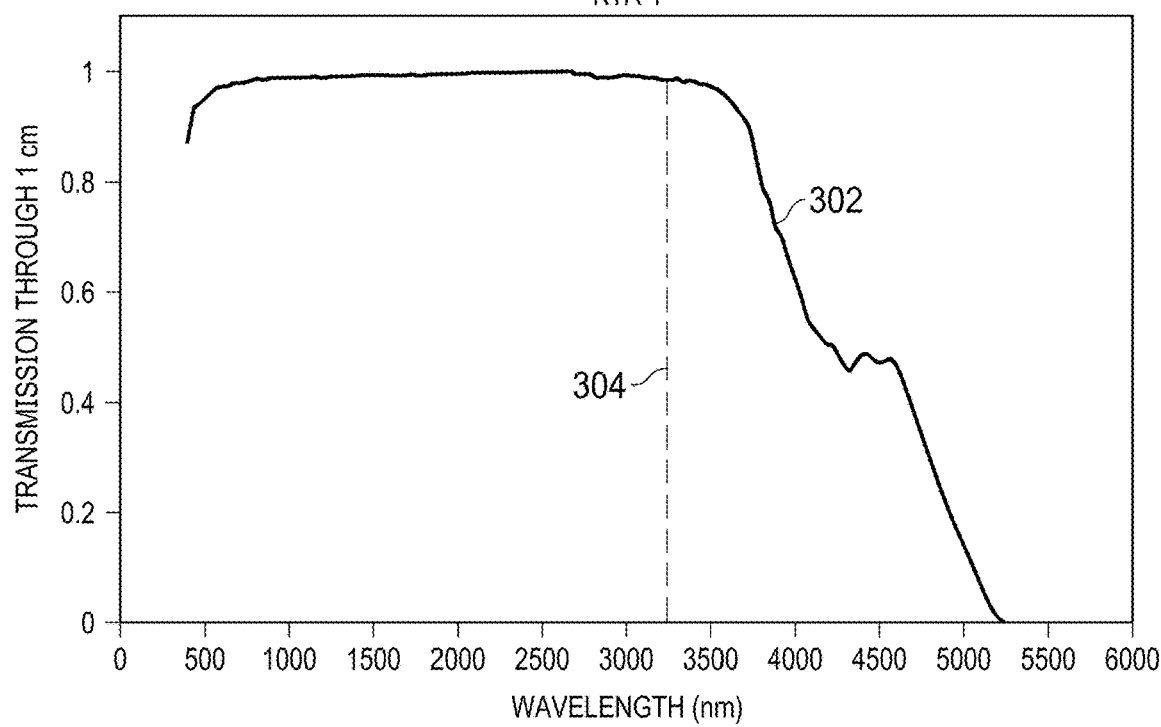
Figure 5:
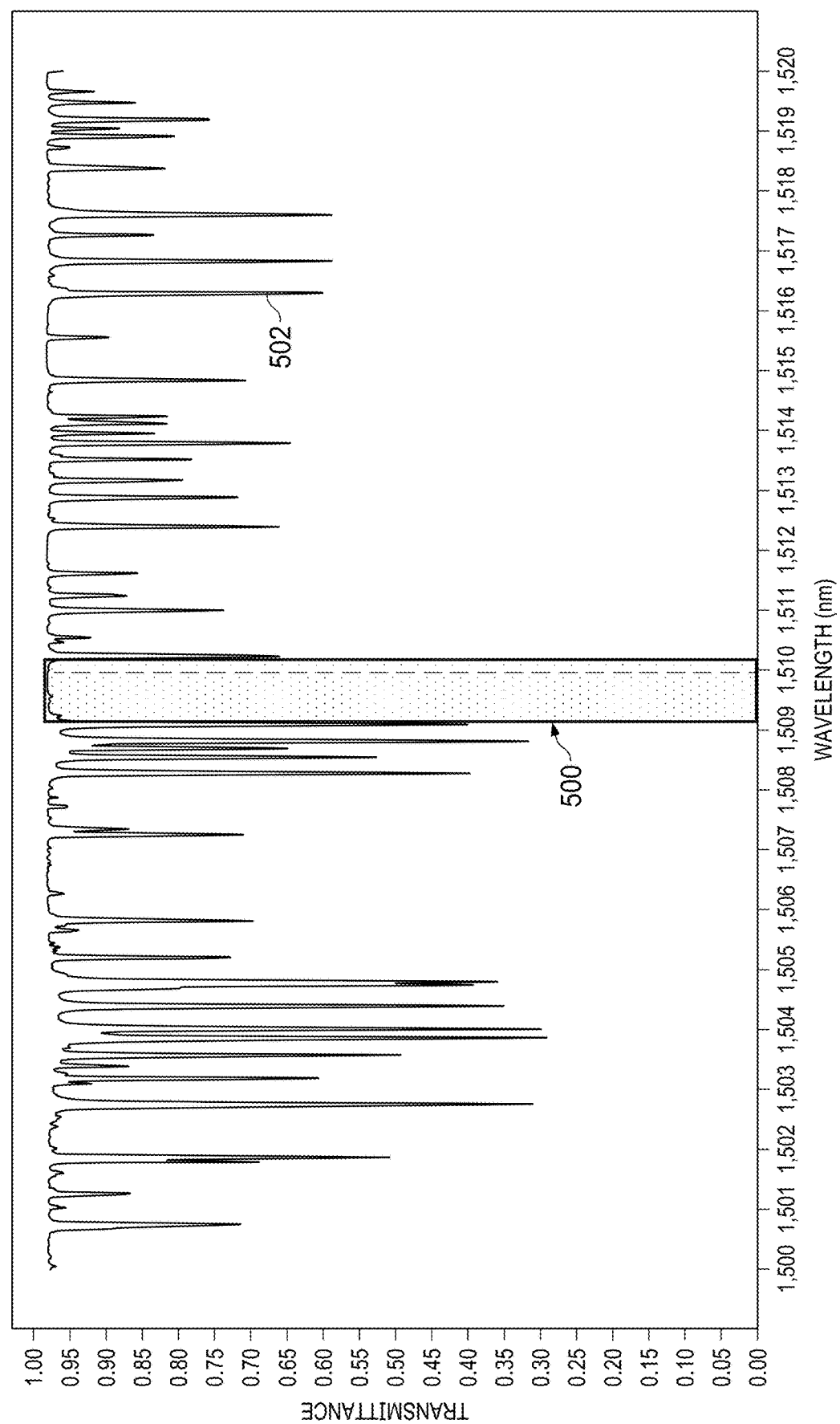
FIG. 5 illustrates an example long path atmospheric transmittance spectrum in accordance with this disclosure.
Figure 6A:
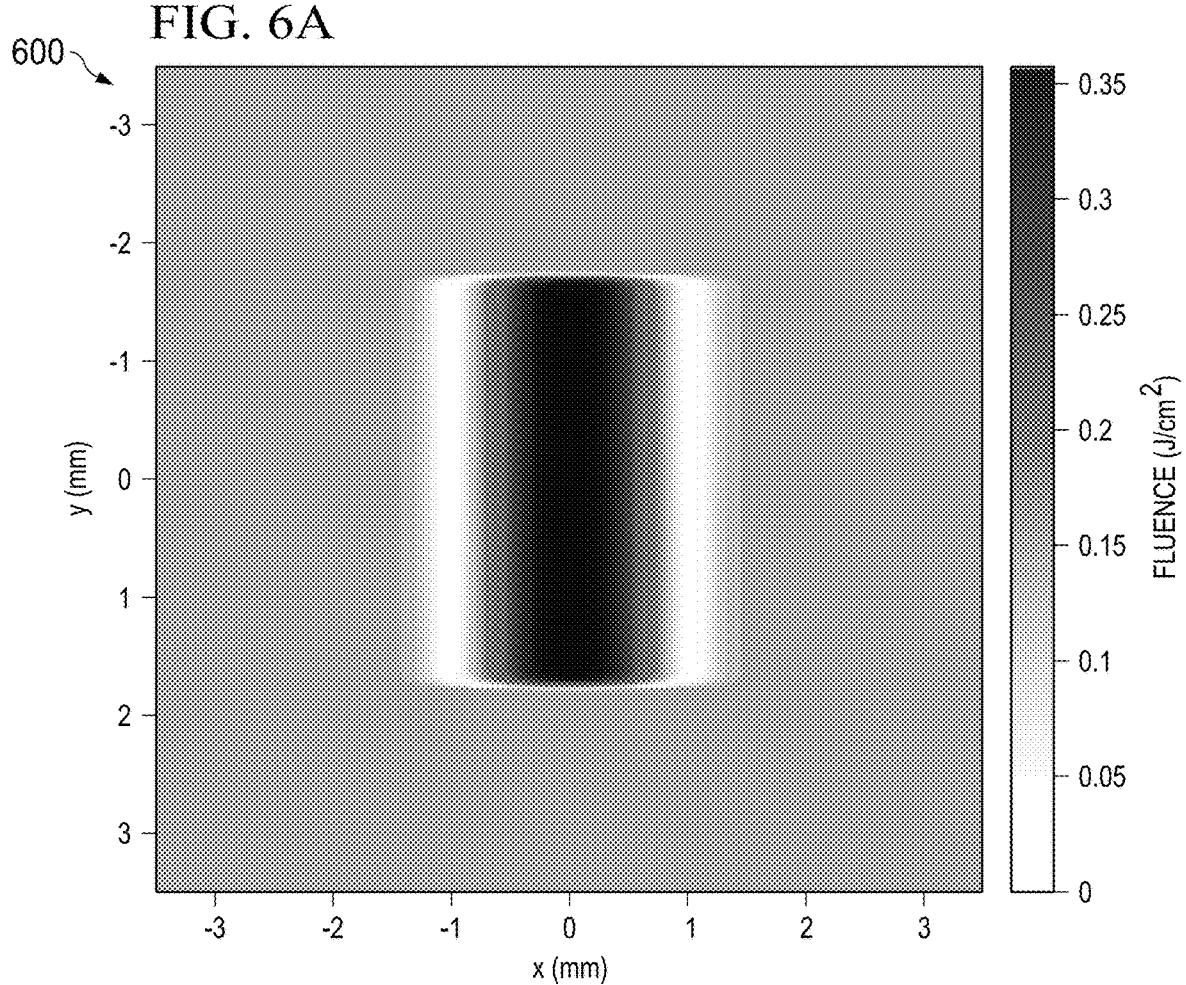
FIGS. 6A through 6C illustrate an example input pump beam profile used for optical parametric amplifier models in accordance with this disclosure.
Figure 6B:
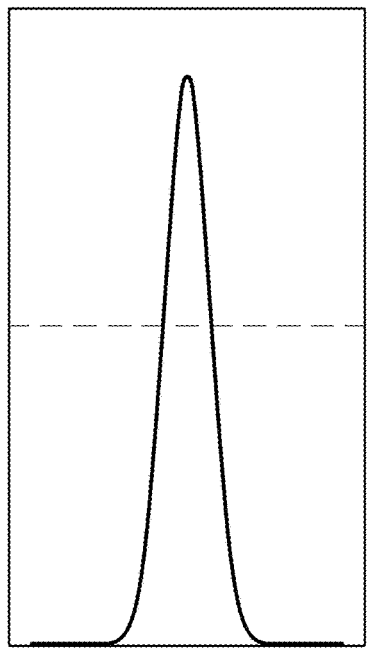
Figure 6C:
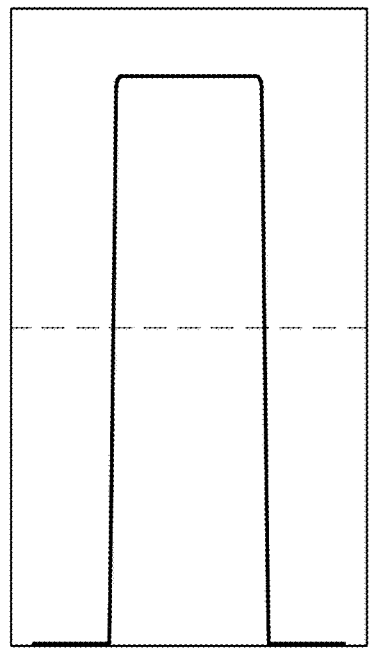
Figure 7A:
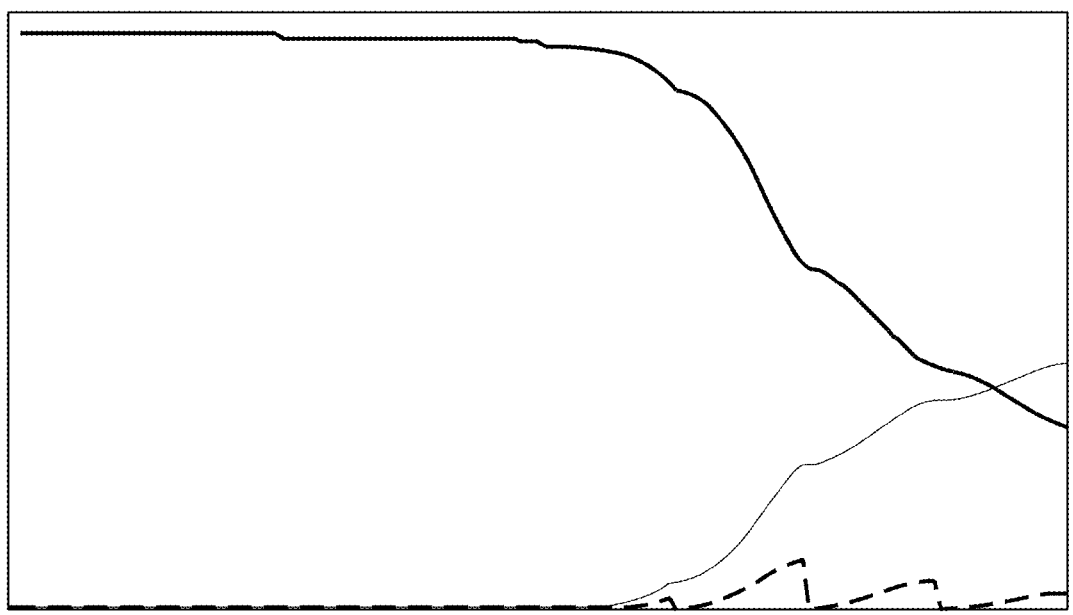
FIGS. 7A and 7B illustrate example optical parametric amplifier energies as a function of crystal path length using singular-type nonlinear optical crystals in an optical parametric amplifier in accordance with this disclosure.
Figure 7B:
Figure 14A:
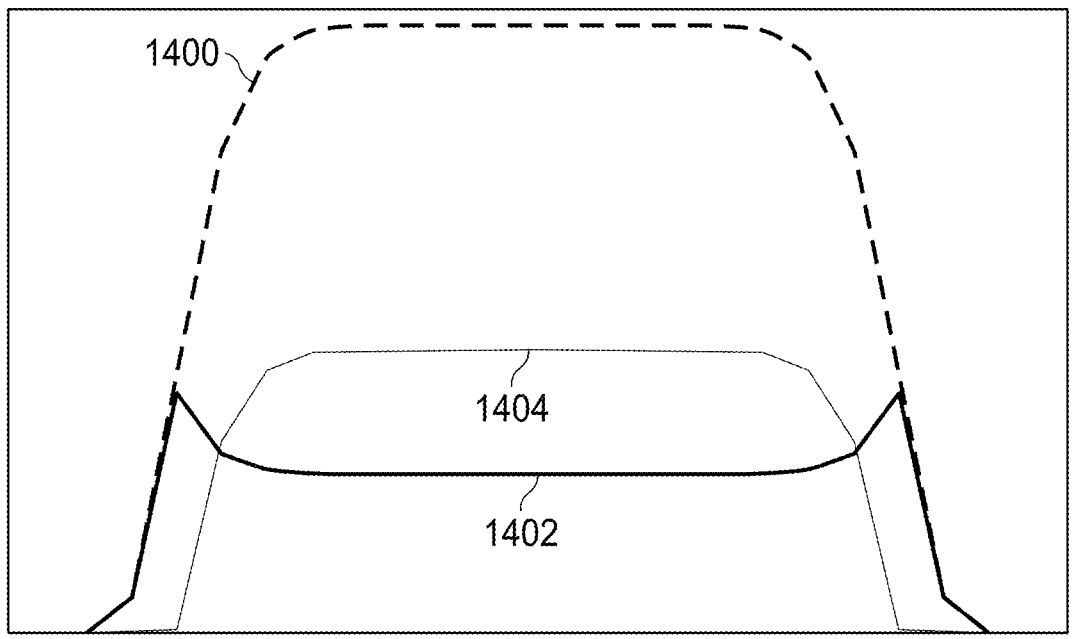
FIGS. 14A and 14B illustrate example pump temporal pulses and signal temporal pulses for singular-type nonlinear optical crystal optical parametric amplifiers in accordance with this disclosure.
Figure 14B:
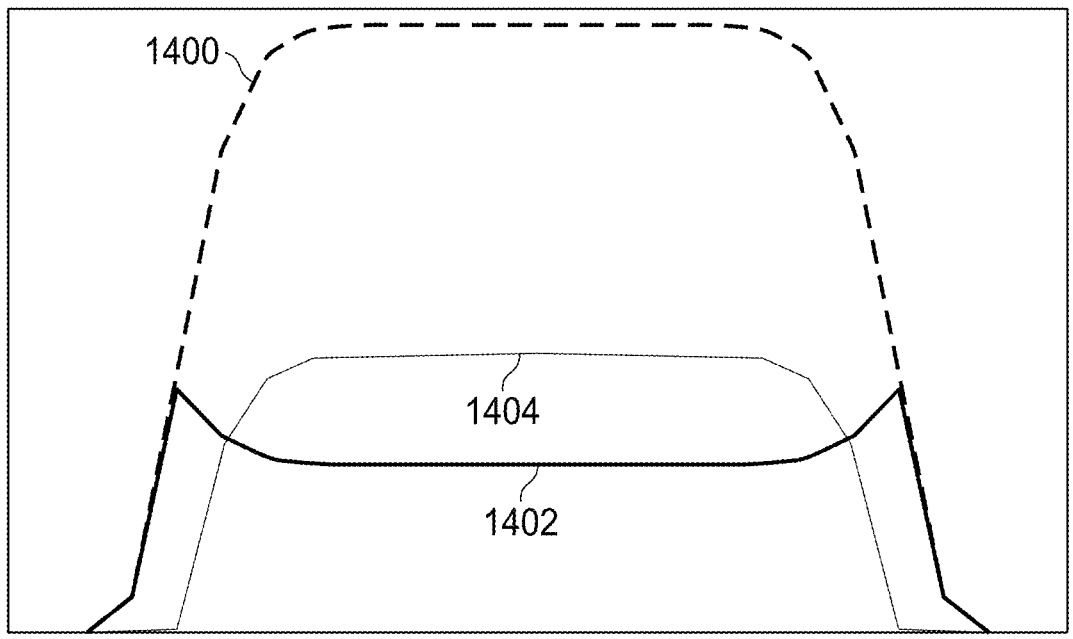
Figure 15A:
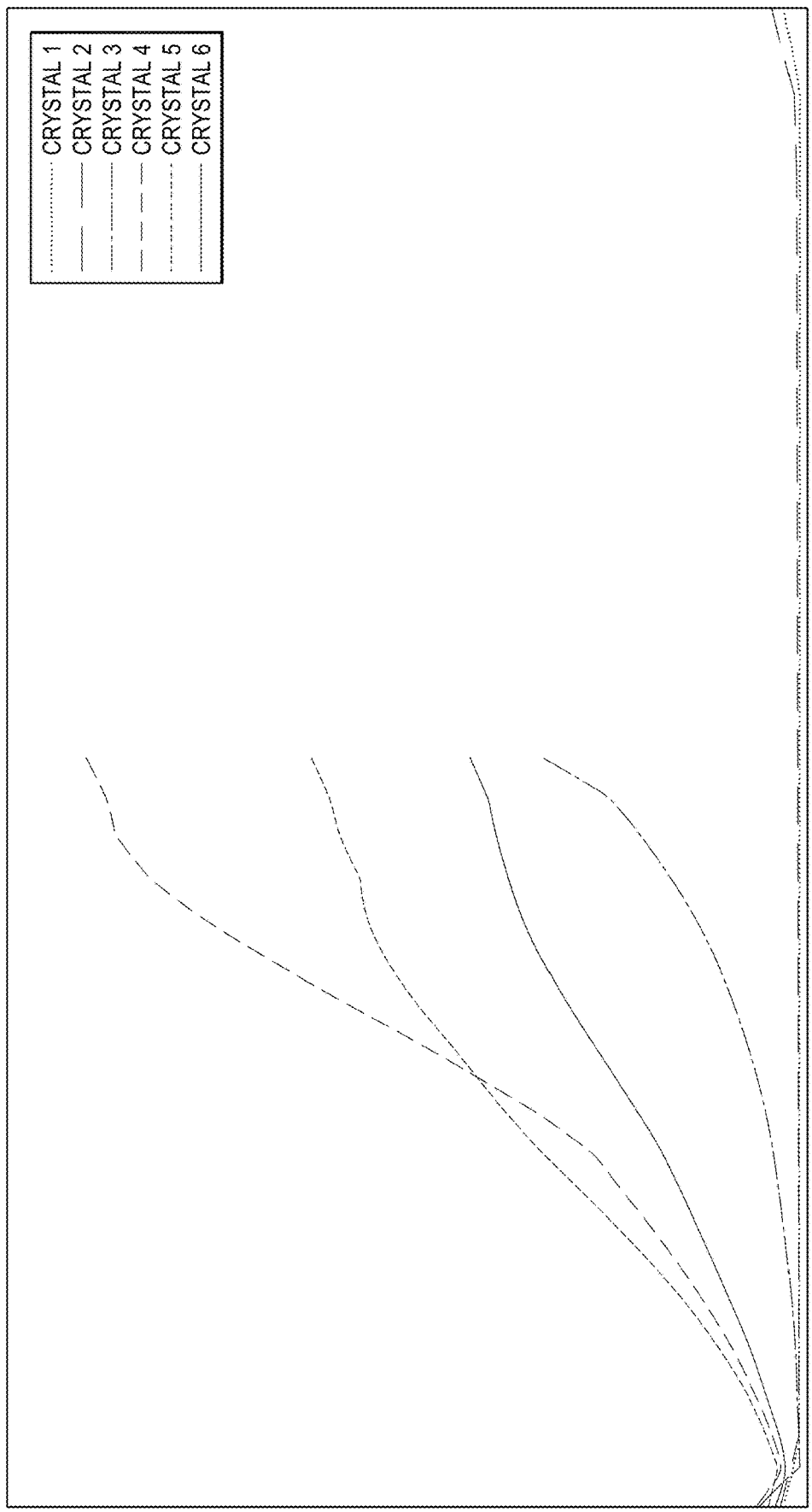
FIGS. 15A and 15B illustrate example absorbed power densities along lengths of each nonlinear optical crystal in singular-type nonlinear optical crystal optical parametric amplifiers in accordance with this disclosure.
Figure 15B:
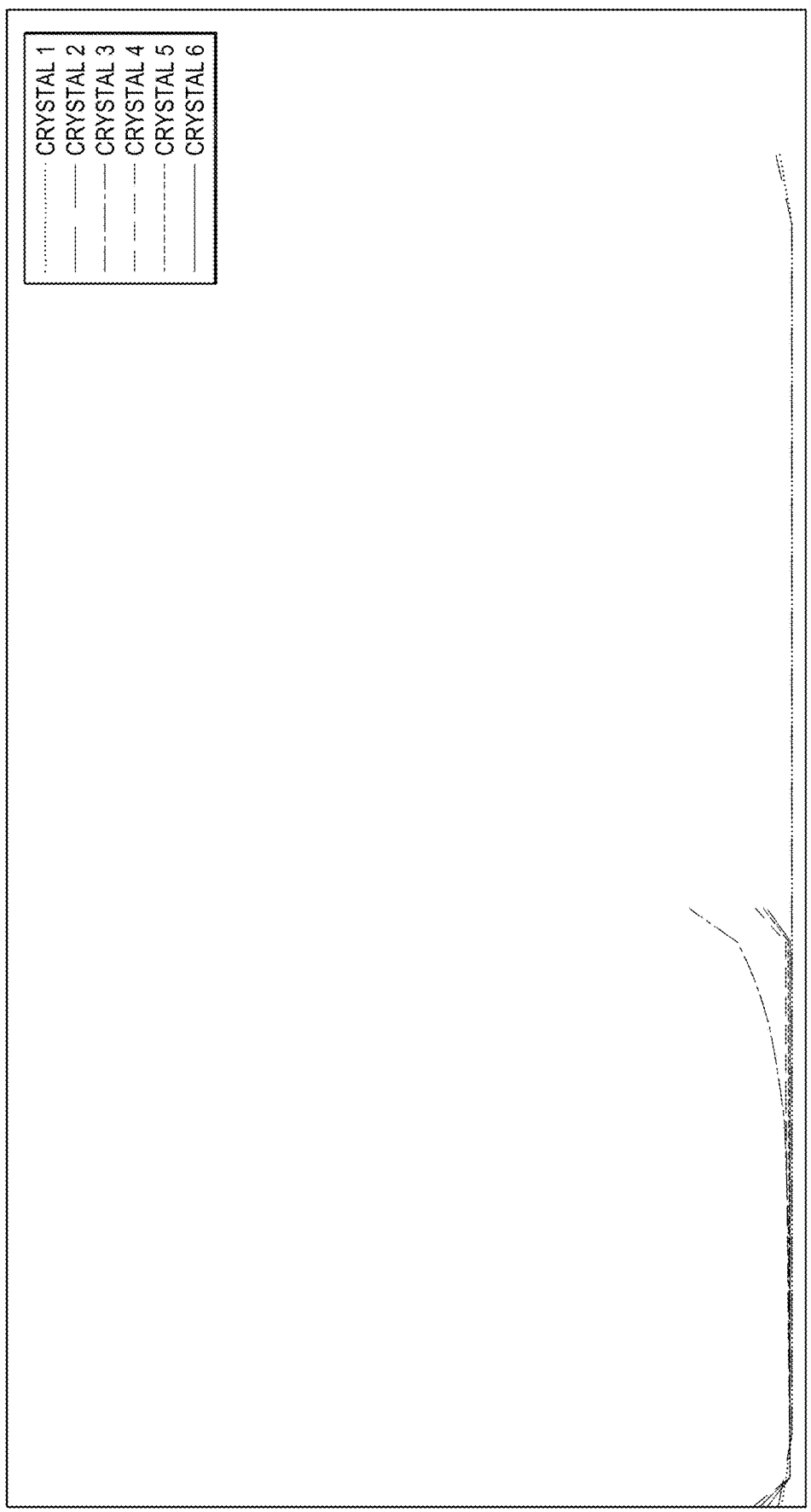
Figure 16A:
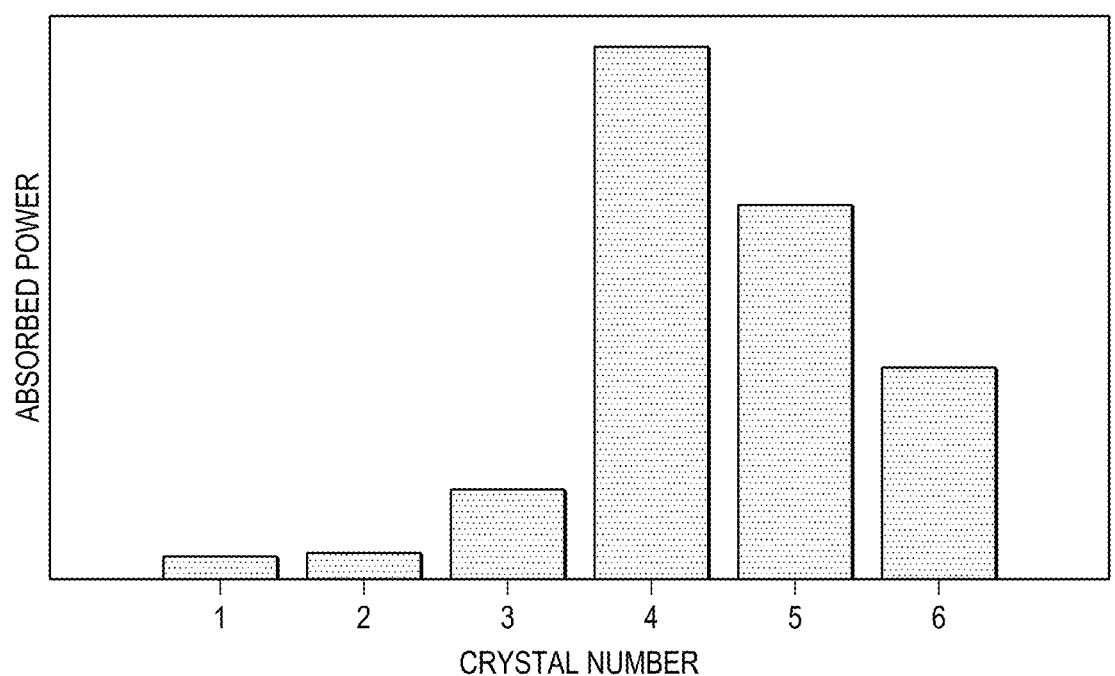
FIGS. 16A through 16C illustrate example total absorbed power in each nonlinear optical crystal for nonlinear optical crystal optical parametric amplifiers in accordance with this disclosure.
Figure 16B:
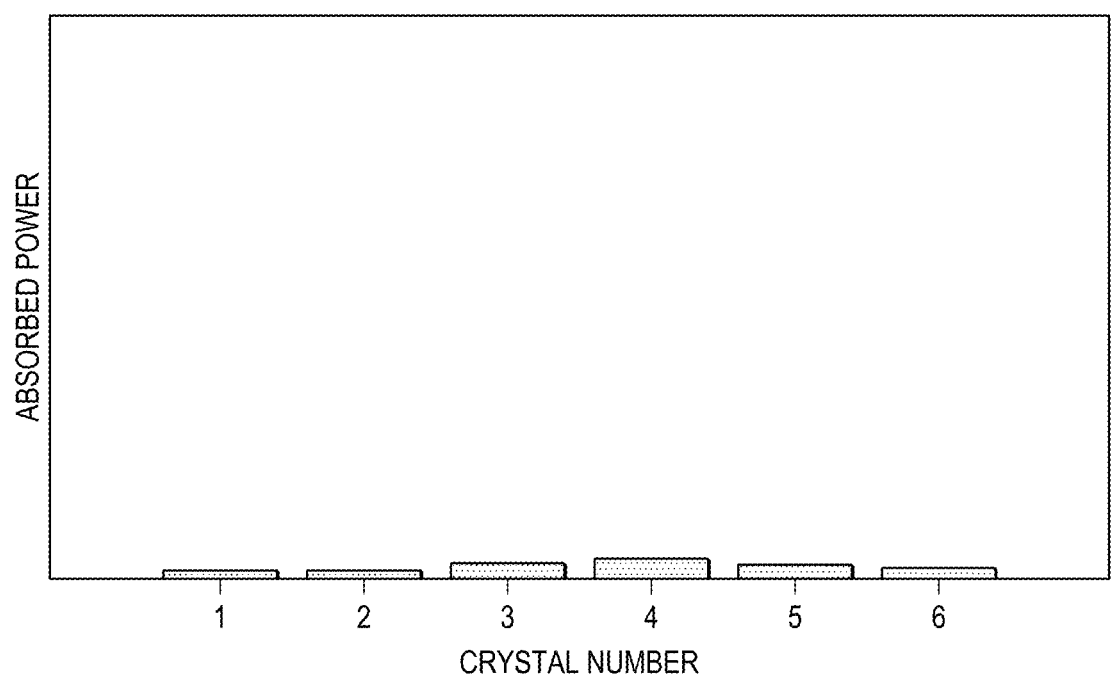
Figure 16C:
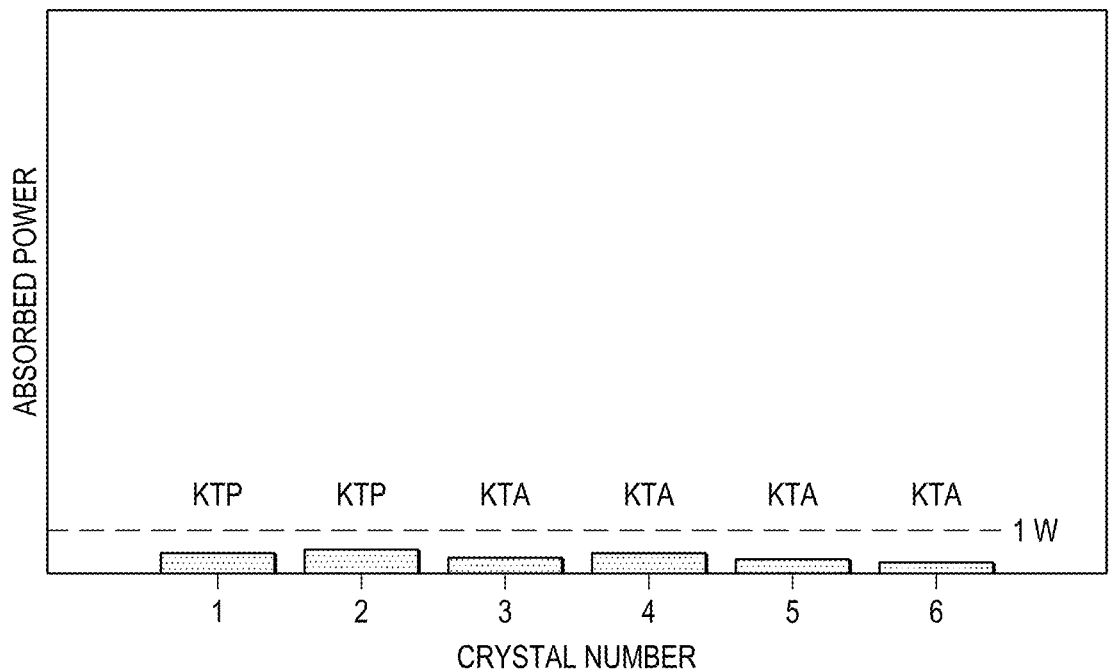
Figure 17A:
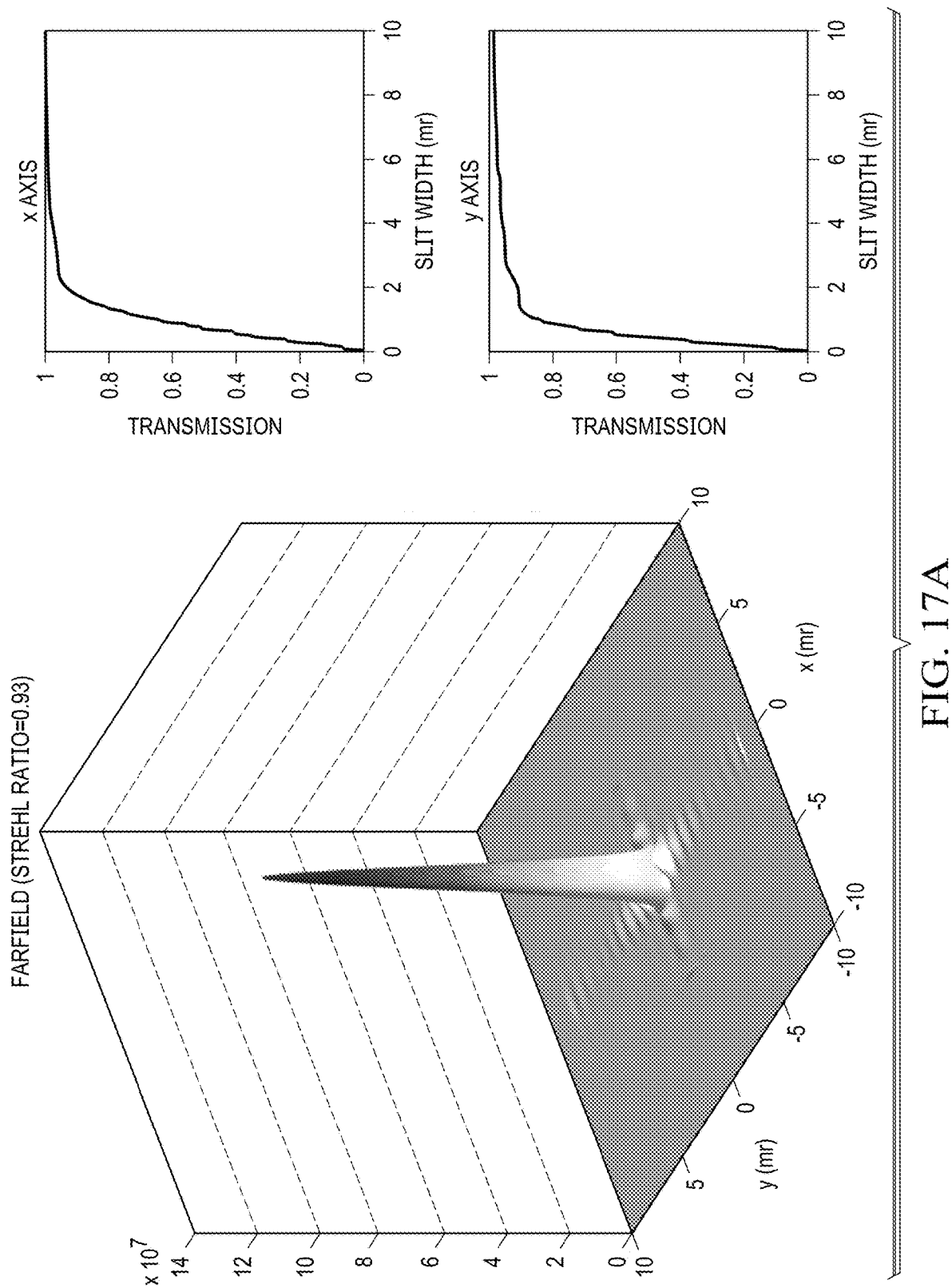
FIGS. 17A and 17B illustrate example far field profiles at a signal frequency for nonlinear crystal arrays in optical parametric amplifiers in accordance with this disclosure.
Figure 17B:
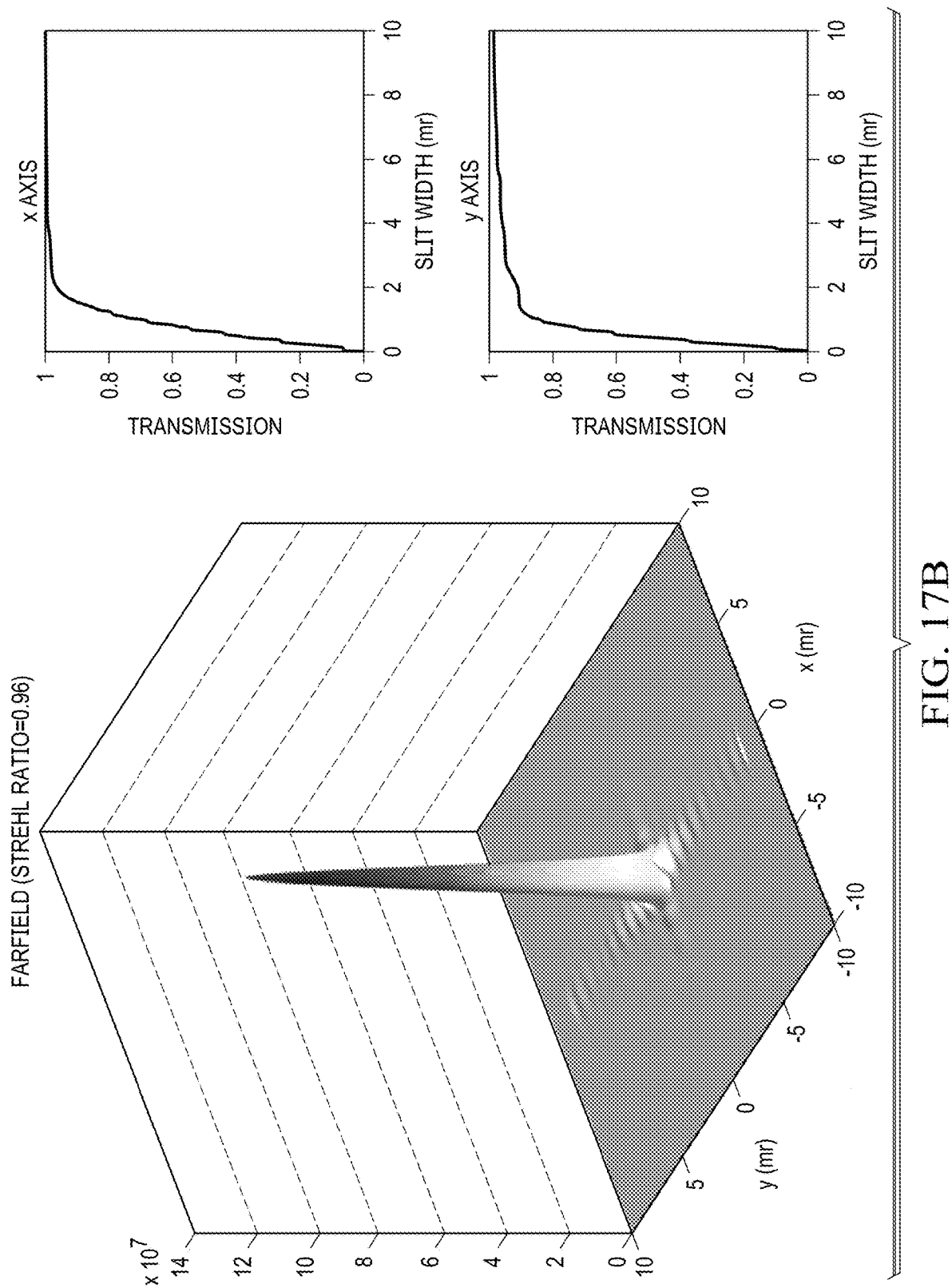

FIGS. 2A through 17B illustrate an example structure for an optical parametric amplifier 200 in accordance with this disclosure. In particular, FIGS. 2A and 2B illustrate a first example hybrid material optical parametric amplifier in accordance with this disclosure. FIGS. 3A and 3B illustrate example nonlinear optical crystal transmission spectra in accordance with this disclosure. FIG. 4 illustrates an example temperature tuning for nonlinear optical crystals in accordance with this disclosure. FIG. 5 illustrates an example long path atmospheric transmittance spectrum in accordance with this disclosure. FIGS. 6A through 6C illustrate an example input pump beam profile used for optical parametric amplifier models in accordance with this disclosure. FIGS. 7A and 7B illustrate example optical parametric amplifier energies as a function of crystal path length using singular-type nonlinear optical crystals in an optical parametric amplifier in accordance with this disclosure. FIGS. 8A through 8F illustrate an example signal beam propagation evolution through an all-KTP-crystal optical parametric amplifier in accordance with this disclosure. FIGS. 9A through 9F illustrate an example signal beam propagation evolution through an all-KTA-crystal optical parametric amplifier in accordance with this disclosure. FIGS. 10A through 10F illustrate an example signal beam propagation evolution through a hybrid-KTP/KTA-crystal optical parametric amplifier in accordance with this disclosure. FIGS. 11A through 11F illustrate an example pump beam propagation evolution through an all-KTP-crystal optical parametric amplifier in accordance with this disclosure. FIGS. 12A through 12F illustrate an example pump beam propagation evolution through an all-KTA-crystal optical parametric amplifier in accordance with this disclosure. FIGS. 13A through 13F illustrate an example pump beam propagation evolution through a hybrid-KTP/KTA-crystal optical parametric amplifier in accordance with this disclosure. FIGS. 14A and 14B illustrate example pump temporal pulses and signal temporal pulses for singular-type nonlinear optical crystal optical parametric amplifiers in accordance with this disclosure. FIGS. 15A and 15B illustrate example absorbed power densities along lengths of each nonlinear optical crystal in singular-type nonlinear optical crystal optical parametric amplifiers in accordance with this disclosure. FIGS. 16A through 16C illustrate example total absorbed power in each nonlinear optical crystal for nonlinear optical crystal optical parametric amplifiers in accordance with this disclosure. FIGS. 17A and 17B illustrate example far field profiles at a signal frequency for nonlinear crystal arrays in optical parametric amplifiers in accordance with this disclosure;

As shown in FIGS. 2A and 2B, a high-average-power-capable optical parametric amplifier 200 can include a "hybrid" material design that exploits beneficial properties in each of its constituent crystalline materials. The optical parametric amplifier 200 can receive input signals 202, such as the pulsed pump beam 102 and the signal seed 104 shown in FIG. 1. The input signals 202 are propagated through a hybrid array of first nonlinear optical crystals 204a-204b in a front-end stage, second nonlinear optical crystals 206a-206d in a back-end stage, and dichroic beamsplitters 208a-208e positioned between each pair of adjacent nonlinear optical crystals. The optical parametric amplifier 200 can employ KTP crystals 204a-204b in the front-end stage and KTA crystals 206a-206d in the back-end stage. In some embodiments, RTA crystals can be substituted for the KTA crystals 206a-206d. The optical parametric amplifier 200 can be seeded with a low-power source, such as a 1.5-micron diode laser having a power of one or a few dozen milliwatts. The optical parametric amplifier 200 can be pumped at a different wavelength using a suitable source, such as about 1030 nm using a Yb:YAG master-oscillator-power-amplifier (MOPA) transmitter with a planar-waveguide (PWG) power amplifier. Each of the nonlinear optical crystals 204a-204b and 206a-206d amplifies a signal to produce an output signal 210a-210e, which can include an amplified signal 212a-212e and an idler frequency 214a-214e. In some embodiments, the dichroic beamsplitters 208a-208e are used between the nonlinear optical crystals to extract the idler frequency 214a-214e from the amplified signal 212a-212e in each output signal 210a-210e.

The input signal 202 or the amplified signal 212a-212e is fed into each front-end crystal 204a-204b and each back-end crystal 206a-206d in a manner to produce an output signal 210a-210e and ultimately a resultant amplified signal 216. Each of the output signals 210a-210e is split using one of the dichroic beamsplitters 208a-208e to extract the idler frequencies 214a-214e from the amplified signals 212a-212e, respectively.

The front-end crystals 204a-204b and the back-end crystals 206a-206d can be formed using any suitable process(es). For example, the front-end crystals 204a-204b and the back-end crystals 206a-206d can be flux-grown, hydro-thermally grown, or grown or otherwise fabricated using any other suitable process(es). The front-end crystals 204a-204b and the back-end crystals 206a-206d may be formed using any suitable materials, and the front-end crystals 204a-204b and the back-end crystals 206a-206d may have any suitable size and shape suitable for amplifying an optical signal. For example, the front-end crystals 204a-204b and the back-end crystals 206a-206d may be formed using KTP crystals, KTA crystals, or RTA crystals. While the front-end crystals 204a-204b and the back-end crystals 206a-206d are described as being different from each other, either of the front-end crystals 204a-204b and the back-end crystals 206a-206d may also be different within their own group. For instance, one or more of the back-end crystals 206a-206c may be KTA crystals, while one or more of the back-end crystals 206d may be an RTA crystal. The dichroic beamsplitters 208a-208e can be formed using any suitable material for splitting a beam and arranged in any manner to extract idler frequencies 214a-214e.

In some embodiments, a Type-2 phase matching is employed for both the front-end crystals 204a-204b and the back-end crystals 206a-206d, which means that the idler polarization is perpendicular to the signal and pump polarizations. The front-end crystals 204a-204b and the back-end crystals can be selected based on one or more of idler power and desired parametric gain at front-end and back-end stages of the chain. The pump and signal polarizations are parallel to each other. As shown in FIGS. 3A and 3B, transmission spectra 300, 302 for KTP crystals and KTA crystals are measured based on transmission through one centimeter of a crystal versus a wavelength of the signal. An idler wavelength 304 may be around 3244 nm in this example. The transmission spectra and other properties for nonlinear materials can be estimated using any suitable software tool for nonlinear modeling, such as the Select Nonlinear Optics (SNLO) software tool developed at Sandia National Labs.

At a front end of the optical parametric amplifier 200, high parametric gain is provided since the signal frequency (such as about 1.5 microns) is starting from a very low level. Pump depletion in the early front-end crystals 204a-204b is negligible, which means that longer crystal lengths between idler extractions can be employed here. Since the average power of the idler frequency is also very low in this region of the optical parametric amplifier 200, crystalline materials with absorption at the idler frequency (such as KTP crystals) are acceptable without incurring a significant heat load penalty.

In some embodiments, KTA crystals can be employed as the back-end crystals 206a-206d in the chain of the optical parametric amplifier 200. Significant pump depletion is present in these back-end crystals 206a-206d, which means shorter crystal lengths between idler extractions can be used to avoid back conversion. The available size of KTA crystals is more than sufficient in this region of the optical parametric amplifier 200. The idler power is high in this region of the optical parametric amplifier 200, which means crystalline materials with low idler absorption (such as KTA crystals or RTA crystals) can be used here.

In some embodiments, the front-end crystals 204a-204b (such as KTP crystals) may be cut for non-critical phase-matching, with the crystalline x-axis aligned to the beam propagation axis. There is zero walk-off at any of the three wavelengths in NCPM KTP. The back-end crystals 206a-206d (such as KTA crystals) may be cut for critical phase-matching (CPM), with the beam propagation axis aligned in the crystalline x-z plane. Walk-off at the idler frequency can be compensated by alternating the KTA crystal axes orientations as shown in FIGS. 2A and 2B. There is zero walk-off at the pump and signal frequencies since their polarizations are aligned to the crystalline y-axis. "Walk-off compensation" takes the following condition into consideration. In spite of the phase matching, energy contained in finite radiation diameters propagates in slightly different directions in nonlinear optical crystals. The consequence of this is that, after a finite travel, the pump beam and the initially-generated signal seed may have diverged. This diverging effect can be compensated based on an orientation of the nonlinear optical crystals.

As shown in FIG. 4, a temperature tuning curve 400 for KTP crystals and a temperature tuning curve 402 for KTA crystals are given. In some embodiments, a signal wavelength 404 can be about 1510 nm. NCPM KTP crystals tune to the specific signal wavelength at an operating temperature or crystal temperature 406 of about 43.3° C., and KTA crystals are angle-tuned to phase match at the same temperature. This allows all of the nonlinear optical crystals of the optical parametric amplifier 200 to be regulated to the same temperature from a common heatsink.

As shown in FIG. 5, there is a range of signal wavelengths that can be employed within a transmission window 500. For example, a signal wavelength 502 of 1510 nm is an eye-safe wavelength and also lies within a transmission window 500 of the atmosphere. The latter property is desirable for any potential laser detection and ranging (LADAR) applications or other applications. In other embodiments, the signal wavelength 502 can be tuned to other wavelengths by adjusting the crystal temperatures 406 and the tuning angle of the KTA crystals.

As shown in FIGS. 6A through 6C, an input beam profile 600 can be defined for the optical parametric amplifier 200. Here, a simulation can be performed in two models, such as (1) an all-KTP optical parametric amplifier model and (2) an all-KTA optical parametric amplifier model. The optical parametric amplifier model scripts can be written using a software package for physical optics modeling, such as the GLAD software application developed by APPLIED OPTICS RESEARCH. For each of the simulations, a 1030 nm pump beam profile 600 may be used at the input of the optical parametric amplifier 200. The models approximate the beam profile corresponding to the Yb:YAG PWG power amplifier output imaged onto a first crystal surface in the optical parametric amplifier 200. The input temporal pulse shape of the pump has a near-square shape with a full-width-half-maximum (FWHM) of 0.8 nanoseconds, which is shown in FIGS. 14A and 14B described below. An average power of 1000 watts and a pulse repetition frequency (PRF) of 65 kHz may be assumed for the pump input to the optical parametric amplifier 200. These inputs result in a pump energy of 15.4 mJ and a peak pump fluence of 0.36 J/cm² at the input of the optical parametric amplifier 200. The value of the peak pump fluence is more than an order of magnitude below the typical optical damage thresholds of anti-reflective-coated KTP crystals and KTA crystals at this pulse width. These models calculate the heat loads in the optical parametric amplifier crystals due to optical absorption but do not include thermal models for computing the resulting temperature gradients. For the purposes of this disclosure, the latter is not required.

The all-KTP optical parametric amplifier model may be represented as two 20 mm-long crystals in the front end and four 10 mm-long crystals in the back end. The all-KTA optical parametric amplifier model may be represented as two 22.4 mm-long crystals in the front end and four 10 mm-long crystals in the back end. In both optical parametric amplifier models, the idler frequency can be 99% extracted between each of the adjacent crystals to simulate a dichroic beamsplitter idler-extractor. In the KTP model, the two front-end crystals are identical to the two front-end crystals 204 in the optical parametric amplifier 200. In the KTA model, the four back-end crystals are identical to the four back-end crystals 206 in the optical parametric amplifier 200. The idler walk-off in the two front-end crystals can be suppressed in the KTA model, and their lengths can be adjusted so that a front-end signal output energy approximately matches the corresponding all-KTP optical parametric amplifier front-end signal output energy of about 30 μJ. The predicted energies after each crystal stage for both optical parametric amplifier simulations are listed in TABLE 1 and TABLE 2. Pump, signal, and idler energies as a function of the crystal path length for both optical parametric amplifiers are plotted in FIGS. 7A and 7B.

TABLE 1

All-KTP optical parametric amplifier pulse energies by crystal stage.

| Crystal number | Signal energy at crystal exit (mJ) | Pump energy at crystal exit (mJ) |
|---|---|---|
| 1 | 1.90e−05 | 15.4 |
| 2 | 3.22e−02 | 15.2 |
| 3 | 0.70 | 14.0 |
| 4 | 3.86 | 9.23 |
| 5 | 5.61 | 6.48 |
| 6 | 6.58 | 4.89 |

TABLE 2

All-KTA optica parametric amplifier pulse energies by crystal stage.

| Crystal number | Signal energy at crystal exit (mJ) | Pump energy at crystal exit (mJ) |
|---|---|---|
| 1 | 1.96e−05 | 15.4 |
| 2 | 3.46e−02 | 15.2 |
| 3 | 0.48 | 14.4 |
| 4 | 3.11 | 10.4 |
| 5 | 5.29 | 7.02 |
| 6 | 6.42 | 5.19 |

Figure 8C:
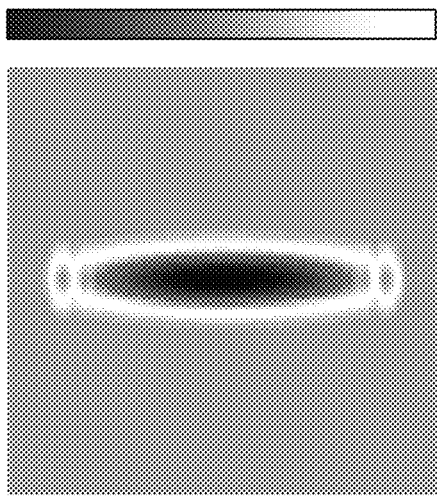
FIGS. 8A through 8F illustrate an example signal beam propagation evolution through an all-KTP-crystal optical parametric amplifier in accordance with this disclosure.
Figure 8F:
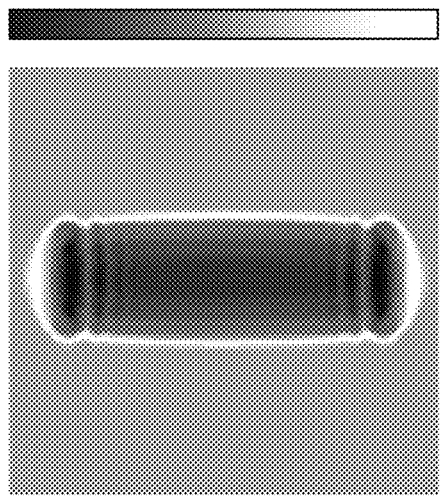
Figure 8B:
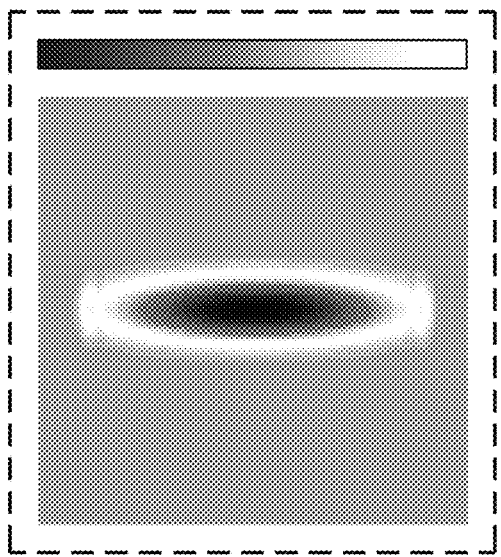
Figure 8E:
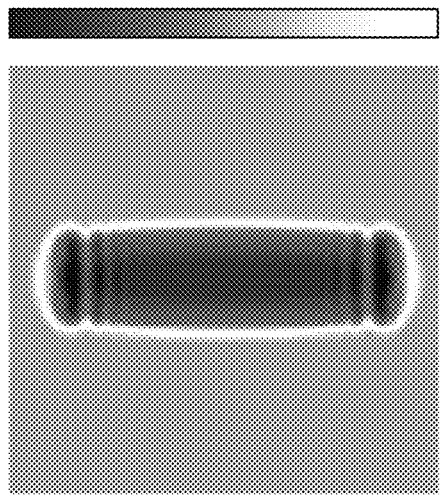
Figure 8A:
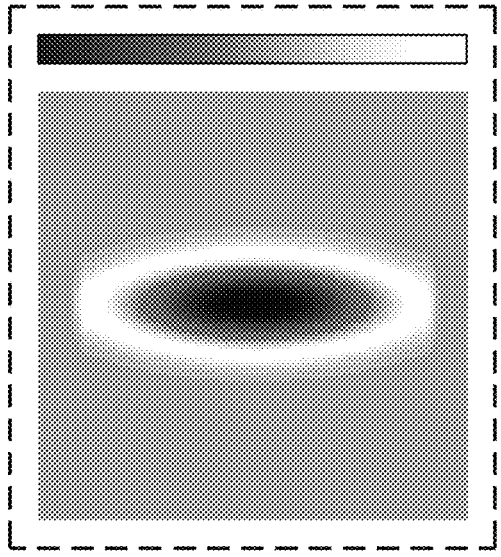
Figure 8D:
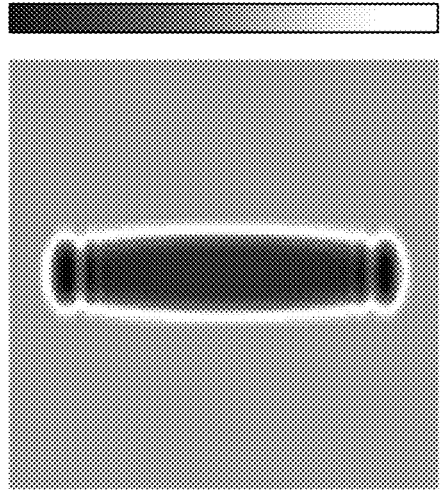
Figure 10A:
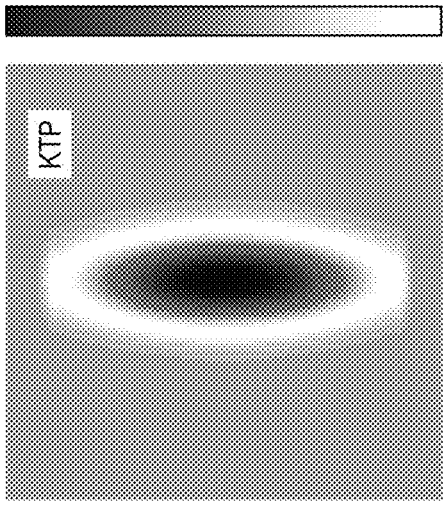
FIGS. 10A through 10F illustrate an example signal beam propagation evolution through a hybrid-KTP/KTA-crystal optical parametric amplifier in accordance with this disclosure.
Figure 10B:
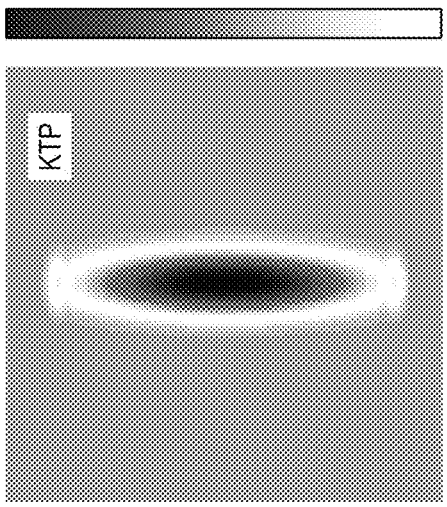
Figure 10C:
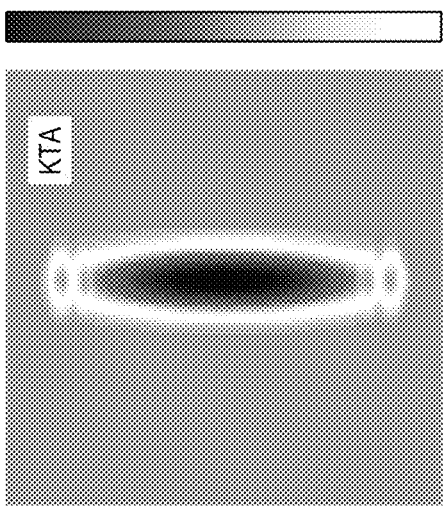
Figure 10D:
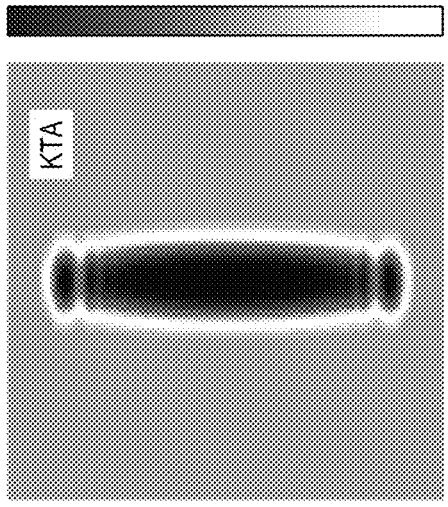
Figure 10E:
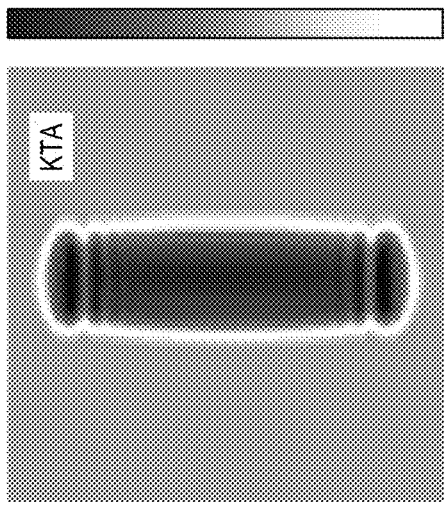
Figure 10F:
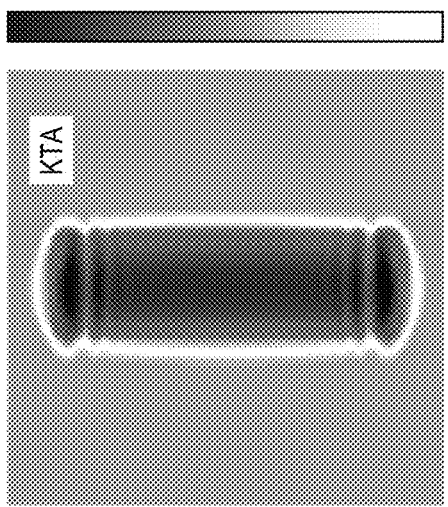
Figure 11C:
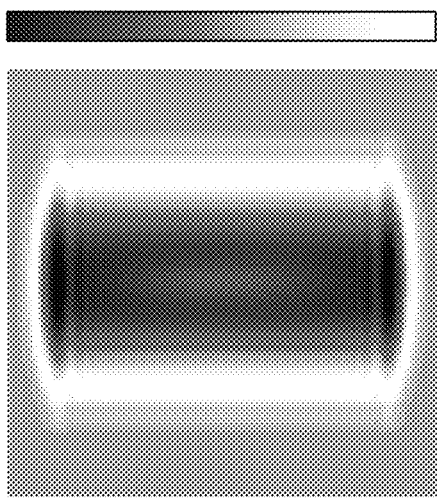
FIGS. 11A through 11F illustrate an example pump beam propagation evolution through an all-KTP-crystal optical parametric amplifier in accordance with this disclosure.
Figure 11F:
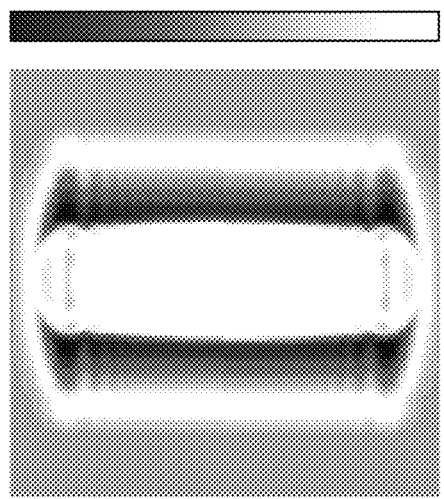
Figure 11B:
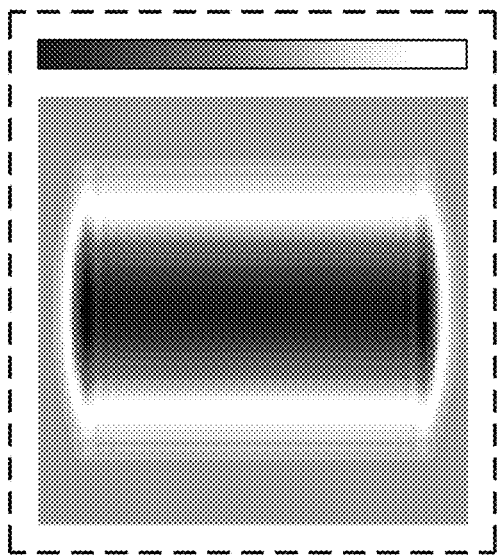
Figure 11E:
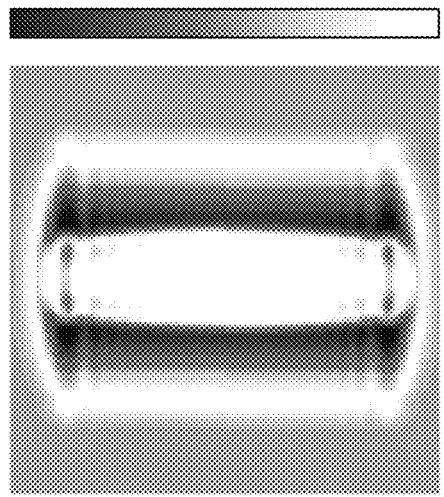
Figure 11A:
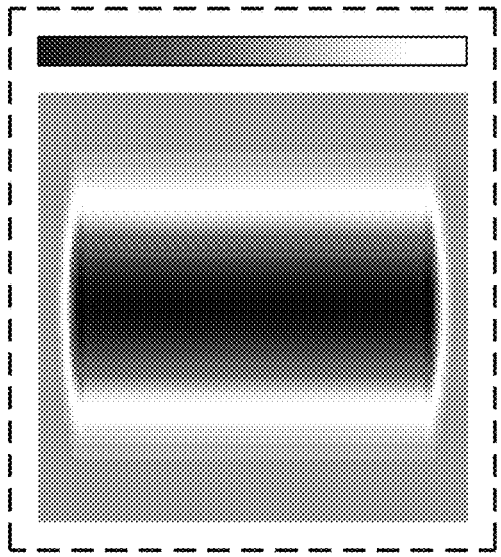
Figure 11D:
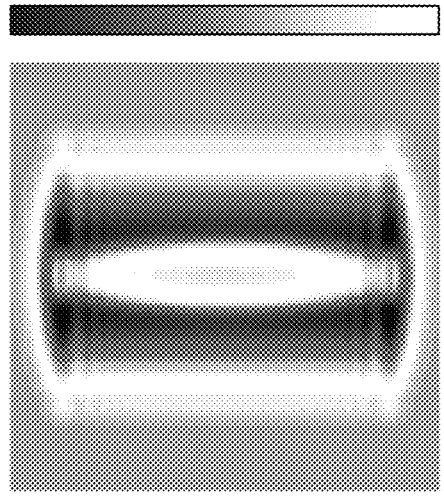
Figure 13A:
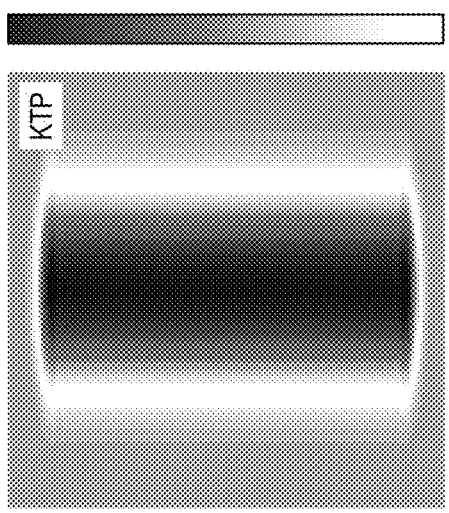
FIGS. 13A through 13F illustrate an example pump beam propagation evolution through a hybrid-KTP/KTA-crystal optical parametric amplifier in accordance with this disclosure.
Figure 13B:
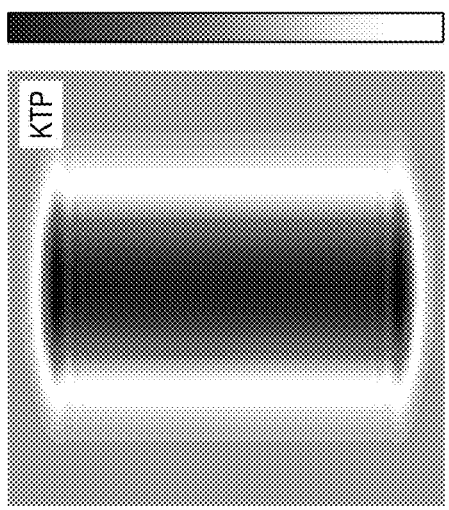
Figure 13C:
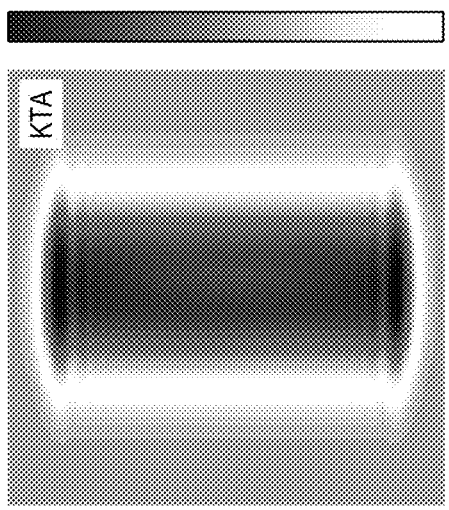
Figure 13D:
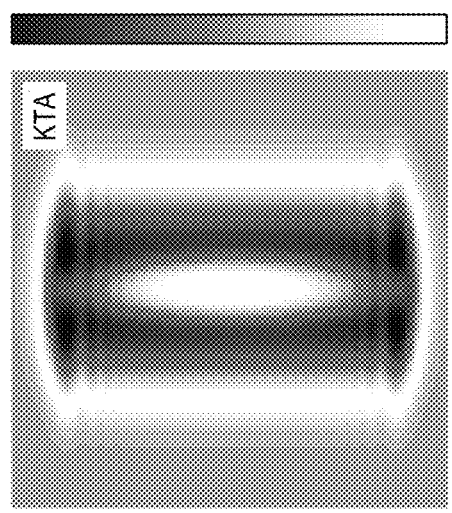
Figure 13E:
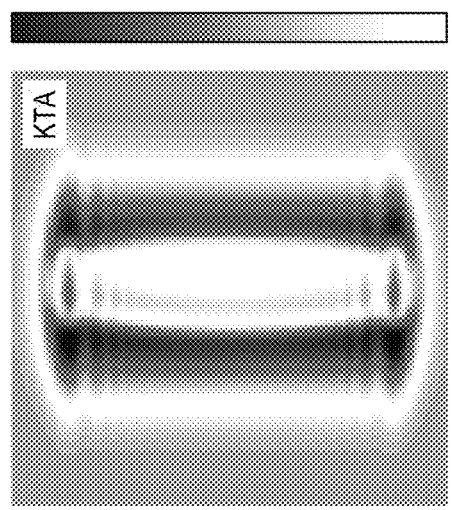
Figure 13F:
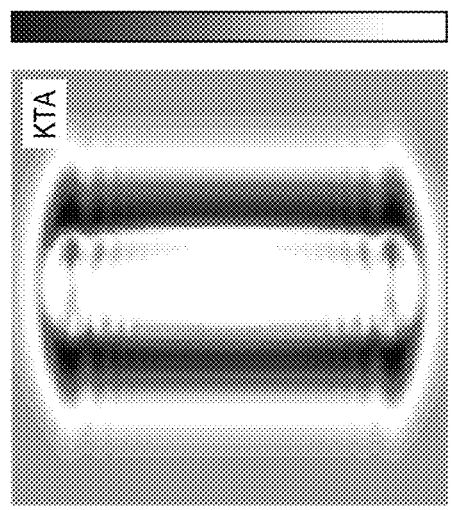

The signal and pump beam simulated propagation through the optical parametric amplifiers are shown in FIGS. 8A through 9F and FIGS. 11A through 12F, respectively. The signal and pump beam simulated through a hybrid optical amplifier are respectively shown in FIGS. 10A through 10F and FIGS. 13A through 13F. FIGS. 8A through 8F illustrate a near-field pump image at each stage of a signal beam propagated through a chain of nonlinear crystals for an all-KTP optical parametric amplifier, and FIGS. 9A through 9F illustrate a near-field pump image at each stage of a signal beam propagated though a chain of nonlinear crystals for an all-KTA optical parametric amplifier. FIGS. 10A through 10F illustrate a near-field pump image at each stage of a signal beam propagated through two front-end crystals implemented as KTP crystals and four back-end crystals implemented as KTA crystals. FIGS. 11A through 11F illustrate a near-field pump image at each stage of a pump beam propagated through a chain of nonlinear crystals for an all-KTP optical parametric amplifier, and FIGS. 12A through 12F illustrate a near-field pump image at each stage of a pump beam propagated though a chain of nonlinear crystals for an all-KTA optical parametric amplifier. FIGS. 10A through 10F illustrate a near-field pump image at each stage of a pump beam propagated through two front-end crystals implemented as KTP crystals and four back-end crystals implemented as KTA crystals. In FIGS. 8A through 13F, the letter of the figures corresponds to the placement of the nonlinear optical crystal in a chain for an optical parametric amplifier. For example, FIG. 8A illustrates a near-field pump image at an exit of a first nonlinear crystal in the chain, and FIG. 8E illustrates a near-field pump image at an exit of a fifth nonlinear crystal in the chain of six or more nonlinear optical crystals.

As shown in FIGS. 14A and 14B, pump input temporal pulses 1400, pump output temporal pulses 1402, and signal output temporal pulses 1404 are plotted for both optical parametric amplifier models. The beam profiles after the two front-end crystals are very similar in both optical parametric amplifiers. The absorbed power densities and heat loads for the crystals in each optical parametric amplifier are respectively shown in FIGS. 15A and 15B and FIGS. 16A and 16B. The back-end crystals of the KTP optical parametric amplifier show significant absorbed power as expected, but the heat loads in the two front-end KTP crystals are very similar to those in the KTA optical parametric amplifier. FIG. 16C illustrates heat loads for the crystals in a hybrid optical amplifier 200. Implementing KTA crystals at the back-end stage significantly reduces power absorption in the optical parametric amplifier 200. As shown in FIGS. 17A and 17B, uncorrected signal far-field profiles are given for both optical parametric amplifiers. Since the predictions for the two front-end crystals in the KTP model are close to the same in all aspects as the two front-end crystals of the KTA model, it is reasonable to expect that the KTA optical parametric amplifier model simulation is a good representation of the performance of the optical parametric amplifier 200.

Although FIGS. 2A through 17B illustrate one example of an optical parametric amplifier 200 and related details, various changes may be made to FIGS. 2A through 17B. For example, there may be any suitable number of nonlinear optical crystals 204a-204b and nonlinear optical crystals 206a-206d in the optical parametric amplifier 200, and there may be any suitable number of dichroic beamsplitters 208a-208e in the optical parametric amplifier 200.

Figure 19:
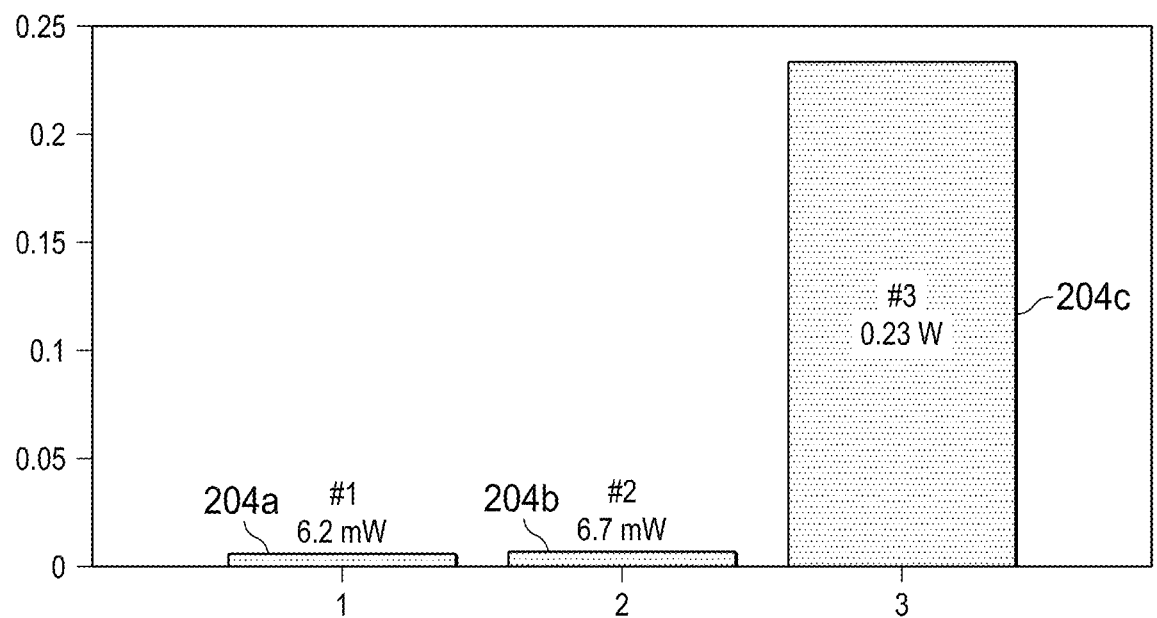
FIG. 19 illustrates an example total absorbed power in a front-end stage of an optical parametric amplifier in accordance with this disclosure.
Figure 18A:
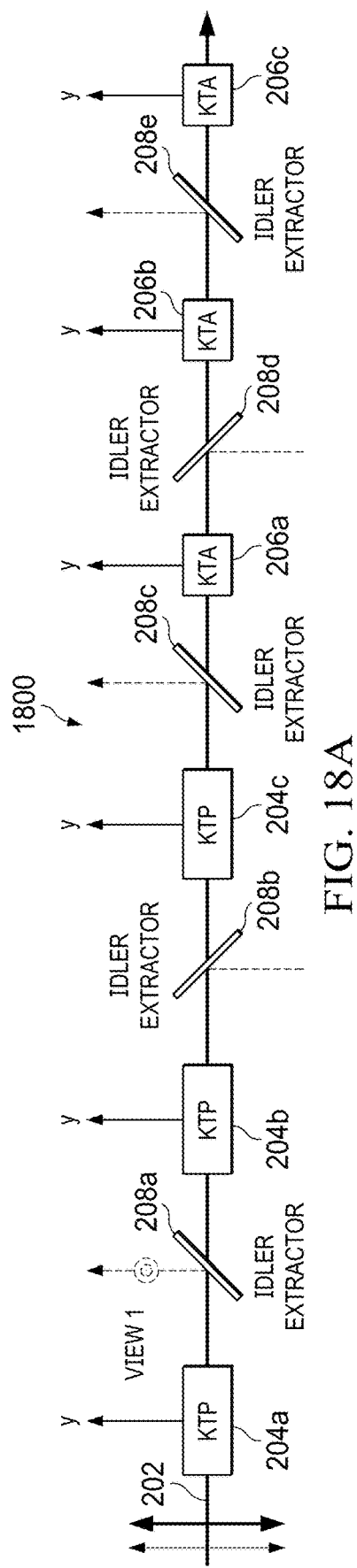
FIGS. 18A and 18B illustrate a second example hybrid material optical parametric amplifier in accordance with this disclosure.
Figure 20:
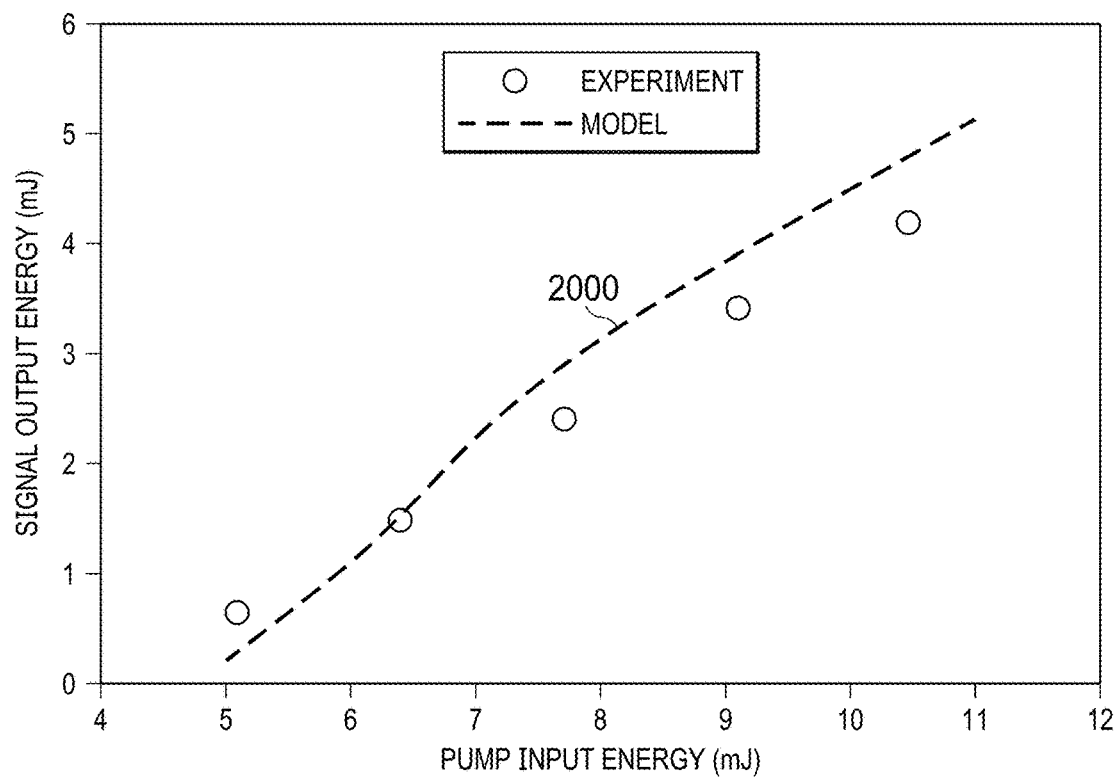
FIG. 20 illustrates example experimental signal output energies for a hybrid nonlinear optical crystal optical parametric amplifier in accordance with this disclosure.
Figure 21:
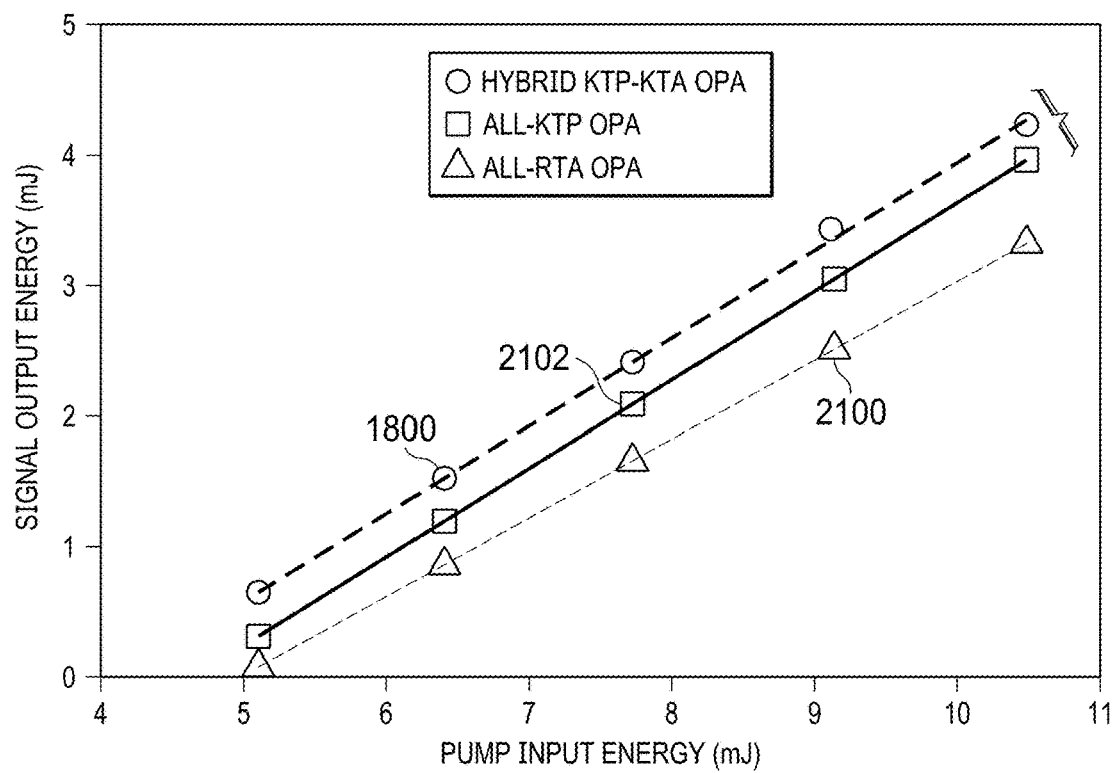
FIG. 21 illustrates example signal output energies for a hybrid nonlinear optical crystal optical parametric amplifier versus a singular-type nonlinear optical crystal optical parametric amplifier in accordance with this disclosure.

FIGS. 18A through 21B illustrate another example structure for an optical parametric amplifier 1800 in accordance with this disclosure. In particular, FIGS. 18A and 18B illustrate a second example hybrid material optical parametric amplifier in accordance with this disclosure. FIG. 19 illustrates an example total absorbed power in a front-end stage of an optical parametric amplifier in accordance with this disclosure. FIG. 20 illustrates example experimental signal output energies for a hybrid nonlinear optical crystal optical parametric amplifier in accordance with this disclosure. FIG. 21 illustrates example signal output energies for a hybrid nonlinear optical crystal optical parametric amplifier versus a singular-type nonlinear optical crystal optical parametric amplifier in accordance with this disclosure.

Figure 18B:
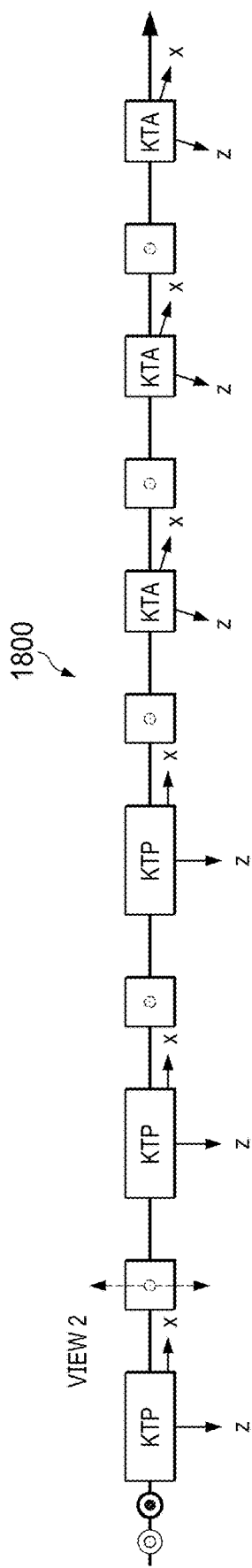

As shown in FIGS. 18A and 18B, the optical parametric amplifier 1800 uses a different crystal array than the optical amplifier 200 shown in FIGS. 2A and 2B. Here, the optical parametric amplifier 1800 includes three first nonlinear optical crystals 204a-204c and three second nonlinear optical crystals 206a-206c. An experimental demonstration of the optical parametric amplifier 1800 may have the configuration parameters given in TABLE 3.

TABLE 3

Configuration parameters for the proof-of-concept demo.

| Parameter | Value |
| --- | --- |
| PRF | 20 kHz |
| Duty cycle | 5% |
| Pump wavelength | 1030 nm |
| Input fast-axis pump beam width | 1 mm (Gaussian profile) |
| Input slow-axis pump beam width | 3.3 mm (near-top-hat profile) |
| Pump input pulsewidth | 1.2 nanoseconds (near-square profile) |
| OPA crystal temperature | 20° C. |
| Signal seed wavelength | 1509 nm |
| Front-end crystals (#1 thru #3) material | KTP |
| Front-end crystals (#1 thru #3) length | 19 mm |
| Back-end crystals (#4 thru #6) material | KTA |
| Back-end crystals (#4 thru #6) length | 10 mm |

One difference between the optical parametric amplifier 1800 and the optical parametric amplifier 200 is the number of front-end crystals and back-end crystals. In the optical parametric amplifier 200, there are two front-end crystals 204a-204b and four back-end crystals 206a-206d. In the optical parametric amplifier 1800, there are three front-end crystals 204a-204c and three back-end crystals 206a-206c. Another difference is the length of the KTP crystals, which are used as the front-end crystals. In the optical parametric amplifier 200, the KTP lengths can be about 20 mm. In the optical parametric amplifier 1800, the KTP lengths can be about 19 mm. Other differences are the temperature of the optical parametric amplifier crystals and the signal seed wavelengths. In the optical parametric amplifier 200, the optical parametric amplifier crystals may be regulated to about 43° C. and the seed wavelength may be about 1510 nm. In the optical parametric amplifier 1800, the optical parametric amplifier crystals may be regulated to about 20° C. and the seed wavelength may be about 1509 nm.

As shown in FIG. 19, average estimated heat loads for the front-end crystals is provided for a five percent duty cycle. The first two front-end crystals have a negligible heat load, while the third front-end crystal has a significant heat load increase. As shown in FIG. 20, the measured 1509 nm output energy from a hybrid-KTP-KTA optical parametric amplifier 1800 is plotted as a function of input 1030 nm energy. Also shown is the predicted input-output 2000 for the optical parametric amplifier 1800 using the model described above.

As shown in FIG. 21, experimental data from the hybrid-KTP-KTA optical parametric amplifier 1800 is compared to that from an all-KTP optical parametric amplifier 2100 and an all-RTA optical parametric amplifier 2102. In the latter configuration, the three back-end 10 mm KTA crystals were replaced with three 10 mm KTP crystals. Each of the optical parametric amplifiers is operated at a relatively low pump duty cycle (5%). The measured data from the optical parametric amplifiers is similar, with the KTP-KTA hybrid optical parametric amplifier performing slightly better than the all-KTP optical parametric amplifier and the all-RTA optical parametric amplifier.

Although FIGS. 18A through 21B illustrate another example of an optical parametric amplifier 1800 and related details, various changes may be made to FIGS. 18A through 21B. For example, there may be any suitable number of nonlinear optical crystals 204a-204c and nonlinear optical crystals 206a-206d in the optical parametric amplifier 1800, and there may be any suitable number of dichroic beamsplitters 208a-208e in the optical parametric amplifier 1800.

Note that while various specific values have been provided above (such as specific wavelengths, temperatures, angles, crystal sizes, crystal orientations, PRFs, beam widths, pulsewidths, numbers of crystals, signal energies, and pump energies), these examples are for illustration only and can vary as needed or desired. Also, while various experimental or theoretical operation have been described above and shown in various figures, this information is again for illustration only, and hybrid material optical parametric amplifiers can operate in any other suitable manner.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a plurality of front-end nonlinear optical crystals arranged in a chain and configured to amplify a received signal; and
   a plurality of back-end nonlinear optical crystals arranged in the chain after the front-end nonlinear optical crystals and configured to further amplify the received signal and generate an amplified signal;
   wherein the back-end nonlinear optical crystals are made from a different nonlinear optical crystalline material than the front-end nonlinear optical crystals; and
   wherein the back-end nonlinear optical crystals are angle-tuned to phase match a signal wavelength with the front-end nonlinear optical crystals at a specified operating temperature.

2. The apparatus of claim 1, further comprising:
   a plurality of dichroic beamsplitters included in the chain, each dichroic beamsplitter positioned between two of the nonlinear optical crystals.

3. The apparatus of claim 2, wherein each dichroic beamsplitter is configured to transmit the amplified signal and to reflect an idler frequency.

4. The apparatus of claim 1, wherein the front-end nonlinear optical crystals are formed of potassium titanyl phosphate or rubidium titanyl arsenate.

5. The apparatus of claim 1, wherein the front-end nonlinear optical crystals and the back-end nonlinear optical crystals are selected based on one or more of idler power and desired parametric gain at front-end and back-end stages of the chain.

6. The apparatus of claim 1, wherein the back-end nonlinear optical crystals are formed of potassium titanyl arsenate or rubidium titanyl arsenate.

7. The apparatus of claim 1, wherein the front-end nonlinear optical crystals have a longer length than the back-end nonlinear optical crystals.

8. The apparatus of claim 1, wherein the front-end nonlinear optical crystals are cut for non-critical phase matching with a crystalline x-axis aligned to a beam propagation axis.

9. An apparatus comprising:
   a plurality of front-end nonlinear optical crystals arranged in a chain and configured to amplify a received signal; and
   a plurality of back-end nonlinear optical crystals arranged in the chain after the front-end nonlinear optical crystals and configured to further amplify the received signal and generate an amplified signal;
   wherein the back-end nonlinear optical crystals are made from a different nonlinear optical crystalline material than the front-end nonlinear optical crystals; and
   wherein the back-end nonlinear optical crystals are cut for critical phase matching with a beam propagation axis aligned in a crystalline x-z plane.

10. The apparatus of claim 9, wherein the back-end nonlinear optical crystals are angle-tuned to phase match a signal wavelength with the front-end nonlinear optical crystals at a specified operating temperature.

11. A method comprising:
    receiving and amplifying a signal using a plurality of front-end nonlinear optical crystals arranged in a chain; and
    generating an amplified signal by further amplifying the received signal using a plurality of back-end nonlinear optical crystals arranged in the chain after the front-end nonlinear optical crystals;
    wherein the back-end nonlinear optical crystals are made from a different nonlinear optical crystalline material than the front-end nonlinear optical crystals; and
    wherein the back-end nonlinear optical crystals are angle-tuned to phase match a signal wavelength with the front-end nonlinear optical crystals at a specified operating temperature.

12. The method of claim 11, further comprising:
    using a dichroic beamsplitter included in the chain, transmitting the amplified signal and reflecting an idler frequency.

13. The method of claim 11, wherein:
the chain further comprises multiple dichroic beamsplitters; and
each of the multiple dichroic beamsplitters is positioned between two of the nonlinear optical crystals.

14. The method of claim 11, wherein the front-end nonlinear optical crystals are formed of potassium titanyl phosphate or rubidium titanyl arsenate.

15. The method of claim 11, wherein the back-end nonlinear optical crystals are formed of potassium titanyl arsenate or rubidium titanyl arsenate.

16. The method of claim 11, wherein the front-end nonlinear optical crystals and the back-end nonlinear optical crystals are selected based on one or more of idler power and desired parametric gain at front-end and back-end stages of the chain.

17. The method of claim 11, wherein the front-end nonlinear optical crystals have a longer length than the back-end nonlinear optical crystals.

18. The method of claim 11, wherein the front-end nonlinear optical crystals are cut for non-critical phase matching with a crystalline x-axis aligned to a beam propagation axis.

19. The method of claim 11, A method comprising:

receiving and amplifying a signal using a plurality of front-end nonlinear optical crystals arranged in a chain; and generating an amplified signal by further amplifying the received signal using a plurality of back-end nonlinear optical crystals arranged in the chain after the front-end nonlinear optical crystals;

wherein the back-end nonlinear optical crystals are made from a different nonlinear optical crystalline material than the front-end nonlinear optical crystals; and wherein the back-end nonlinear optical crystals are cut for critical phase matching with a beam propagation axis aligned in a crystalline x-z plane.

20. The method of claim 19, wherein the back-end nonlinear optical crystals are angle-tuned to phase match a signal wavelength with the front-end nonlinear optical crystals at a specified operating temperature.

* * * * *